United States Patent
Kuwatani et al.

(10) Patent No.: US 11,467,658 B2
(45) Date of Patent: *Oct. 11, 2022

(54) APPLICATION PROCESSING SYSTEM, METHOD OF PROCESSING APPLICATION, AND STORAGE MEDIUM STORING PROGRAM FOR PROCESSING APPLICATION

(71) Applicant: Gree, Inc., Tokyo (JP)

(72) Inventors: Takashi Kuwatani, Tokyo (JP); Makoto Chida, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/176,587

(22) Filed: Feb. 16, 2021

(65) Prior Publication Data

US 2021/0165482 A1 Jun. 3, 2021

Related U.S. Application Data

(63) Continuation of application No. 16/268,800, filed on Feb. 6, 2019, now Pat. No. 10,983,590.

(30) Foreign Application Priority Data

Feb. 6, 2018 (JP) .............................. JP2018-019002
Nov. 28, 2018 (JP) .............................. JP2018-221981

(51) Int. Cl.
*G06F 3/01* (2006.01)
*A63F 13/525* (2014.01)
(Continued)

(52) U.S. Cl.
CPC ............ *G06F 3/011* (2013.01); *A63F 13/211* (2014.09); *A63F 13/213* (2014.09); *A63F 13/25* (2014.09);
(Continued)

(58) Field of Classification Search
CPC ........ G06F 3/012; G06F 3/013; G06F 3/0482; G06F 3/011; H04N 13/383; H04N 13/332;
(Continued)

(56) References Cited

U.S. PATENT DOCUMENTS 8,799,810 B1 * 8/2014 Wheeler ................. G06F 1/163
715/785
10,341,612 B2 7/2019 Imaoka
(Continued)

FOREIGN PATENT DOCUMENTS

JP 2016-189999 A 11/2016
JP 2017-058971 A 3/2017
(Continued)

OTHER PUBLICATIONS

Smartphone Game CH, "Play thoroughly at VR Cafe Kana and thoroughly review!", (May 1, 2017), <URL: https://gameappch.com/app/?app=04317>, p. 1-10 (Year: 2017).*
Reconsideration Report by Examiner dated Aug. 26, 2021, issued in corresponding Japanese Patent Application No. 2018-221981 with English translation (11 pgs.).
A method of coping with a case where the "menu icon" is not displayed by Android application, Jul. 24, 2021, [Search on Aug. 26,], Internet <URL:https://atmarkit.itmedia.co.jp/ait/articles/1507/24/news036.html> 7 pgs.
(Continued)

*Primary Examiner* — Mong-Shune Chung
(74) *Attorney, Agent, or Firm* — Pillsbury Winthrop Shaw Pittman, LLP

(57) ABSTRACT

An application processing system provides an interaction with a virtual character to a user, the application processing system having one or more computer processors and being configured to output an image of a virtual space including the virtual character to a head mounted display mounted on a head of the user. In one aspect, the one or more computer processors execute computer-readable instructions to: specify a first action associated with a motion of the head of the user in the virtual space and performed toward the virtual character, based on one or more detection information items obtained by the head mounted display; and specify, in
(Continued)

response to selection of a specific object included in the virtual space, a second action not associated with a motion of the head of the user in the virtual space and performed toward the virtual character, based on the one or more detection information items.

17 Claims, 16 Drawing Sheets

(51) Int. Cl.

| | |
|---|---|
| *A63F 13/533* | (2014.01) |
| *A63F 13/211* | (2014.01) |
| *A63F 13/213* | (2014.01) |
| *A63F 13/426* | (2014.01) |
| *A63F 13/847* | (2014.01) |
| *G02B 27/01* | (2006.01) |
| *A63F 13/428* | (2014.01) |
| *A63F 13/87* | (2014.01) |
| *A63F 13/25* | (2014.01) |
| *G06F 3/0482* | (2013.01) |

(52) U.S. Cl.
CPC .......... *A63F 13/426* (2014.09); *A63F 13/428* (2014.09); *A63F 13/525* (2014.09); *A63F 13/533* (2014.09); *A63F 13/847* (2014.09); *A63F 13/87* (2014.09); *G02B 27/017* (2013.01); *G06F 3/012* (2013.01); *G06F 3/013* (2013.01); *G06F 3/017* (2013.01); *G06F 3/0482* (2013.01); *A63F 2300/8082* (2013.01); *G02B 2027/0138* (2013.01)

(58) Field of Classification Search
CPC . A63F 13/533; A63F 13/25; A63F 2300/8082
See application file for complete search history.

(56) References Cited

U.S. PATENT DOCUMENTS

| | | | |
|---|---|---|---|
| 2015/0352437 A1* | 12/2015 | Koseki | G06F 3/011 463/31 |
| 2016/0246384 A1 | 8/2016 | Mullins et al. | |
| 2016/0287994 A1 | 10/2016 | Tamaoki et al. | |
| 2017/0076503 A1* | 3/2017 | Tamaoki | G06F 3/0482 |
| 2017/0263053 A1* | 9/2017 | Shah | G06F 3/0482 |
| 2018/0262717 A1* | 9/2018 | Imaoka | G06F 3/01 |
| 2019/0294314 A1* | 9/2019 | Tada | G06F 3/0481 |
| 2020/0129850 A1* | 4/2020 | Ohashi | G06F 3/017 |

FOREIGN PATENT DOCUMENTS

| | | |
|---|---|---|
| JP | 6189497 B | 8/2017 |
| JP | 6215441 B1 | 9/2017 |

OTHER PUBLICATIONS

V.A.T.S. | fall-out 4 Strategies, Andraste (The Wayback Machine) [Dec. 20, 2021] [search on Aug. 26, online],2017], Internet <URL:https://web.archive.org/web/20171220161735/https://andraste.info/g/fallout_4/08totechnologies.html> 7 pgs.

Decision of Dismissal of Amendment dated Mar. 2, 2021, issued in corresponding Japanese Patent Application No. 2018-221981, with English translation (12 pgs.).

Decision of Refusal dated Mar. 2, 2021, issued in corresponding Japanese Patent Application No. 2018-221981, with English translation (3 pgs.).

First Office Action dated Mar. 24, 2022, issued in corresponding Chinese Patent Application No. 201910108605.5 with English translation (18 pgs.).

Notice of Reasons for Refusal dated Jun. 14, 2022, issued in corresponding Japanese Patent Application No. 2021-093004 with English translation (9 pgs.).

* cited by examiner

APPLICATION PROCESSING SYSTEM, METHOD OF PROCESSING APPLICATION, AND STORAGE MEDIUM STORING PROGRAM FOR PROCESSING APPLICATION

CROSS-REFERENCE TO RELATED APPLICATIONS

This application is a Continuation Application of U.S. Ser. No. 16/268,800 filed on Feb. 6, 2019, and claims the benefit of priority from Japanese Patent Application Serial No. 2018-019002 (filed on Feb. 6, 2018) and Japanese Patent Application Serial No. 2018-221981 (filed on Nov. 28, 2018), the contents of which are hereby incorporated by reference in their entirety.

TECHNICAL FIELD

The present disclosure relates to an application processing system for providing interaction with a virtual character, a method of processing an application, and a storage medium storing a program for processing an application. More specifically, the present disclosure relates to an application processing system, a method of processing an application, and a storage medium storing a program for processing an application, the application providing interaction with a virtual character in accordance with detection information obtained by a head mounted display.

BACKGROUND

Examples of applications for providing interaction with a virtual character include simulation games that provide interaction with a virtual character. An example of these simulation games is disclosed in Japanese Patent Application Publication No. 2012-055644 ("the '644 Publication").

Games providing such interaction with a virtual character may utilize a head mounted display (hereinafter may be referred to as "HMD") in order to enhance player's sense of immersion in the games. For example, known is a VR game in which a virtual space is displayed on an HMD, and a player wearing the HMD can interact with a virtual character appearing in the virtual space. The game "SUMMER LESSON" from BANDAI NAMCO Entertainment Co., Ltd. is one of this type of VR games (see "Summer Lesson", [online], retrieved on 12, Dec. 2017, Internet (URL: HYPERLINK "http://summer-lesson.bn-ent.net/" http://summer-lesson.bn-ent.net/)).

As disclosed in Japanese Patent Application Publication No. 2017-058969 ("the '969 Publication"), an HMD includes a tracking sensor for sensing the position and orientation of a head of a user. In VR games using an HMD, a viewpoint in a virtual space is set in accordance with detection information obtained by the tracking sensor, and an image of the virtual space as viewed from the viewpoint thus set is displayed on the HMD.

In the game "SUMMER LESSON," the interaction between a user and a virtual character is realized by specifying an action toward the virtual character depending on detection information obtained by a tracking sensor of the HMD and causing the virtual character to perform a reaction to the specified action.

For example, when the user wearing the HMD nods in response to a question made by the virtual character displayed on the HMD, a motion of the user's head corresponding to the nodding is detected, and the action of the user toward the virtual character in the virtual space is specified based on the detected motion of the user's head. For example, when a motion of the user's head corresponding to the nodding is detected, the action of the user toward the virtual character in the virtual space is specified to be the action of responding positively to the question made by the virtual character. For example, when a motion of the user's head corresponding to shaking of the head is detected, the action of the user toward the virtual character is specified to be the action of responding negatively to the question made by the virtual character in the virtual space. A reaction of the virtual character to the action thus specified is determined, and an image of the virtual character performing the determined reaction is displayed on the HMD.

The actions of the user in the virtual space specified based on the detection information obtained by the HMD are limited to those associated with a motion of the user's head such as nodding or shaking the head and eye movement of the user such as gazing at a particular part of the virtual character. In this way, there is a limited variety of actions of the user specified based on the detection signals from the HMD as being performed toward the virtual character.

When an action of the user associated with his/her body part (for example, a hand) other than the head can be specified as an action of the user in the virtual space, the variety of the interaction between the virtual character and the user is increased. Conventionally, actions of the user associated with his/her body part other than the head are specified based on input from an operation controller other than the HMD. A typical conventional operation controller is configured to be gripped by a user. For example, Japanese Patent No. 6189497 discloses that the position of a virtual hand in a virtual space is specified based on the operation of an operation controller gripped by the user, and an action of touching an object in the virtual space with the virtual hand is performed.

As described above, an operation controller other than the HMD is conventionally used to specify an action (for example, an action of touching an object in the virtual space) not associated with the motion of the user's head among the user's actions in the virtual space. Such use of the operation controller may reduce the sense of immersion in the application. Further, there is a drawback that the HMD worn by the user blocks the view in the actual space, making it difficult to operate the operation controller.

There is a demand for an application processing system that makes it possible to perform an action toward a virtual character not associated with a motion of a user's head in the virtual space without use of an operation controller other than the HMD.

SUMMARY

It is an object of the present disclosure to provide a technical improvement which solves or alleviates at least part of the drawbacks of the prior art mentioned above.

Specifically, one object of the present disclosure is to provide a technical improvement in an application processing system capable of performing toward a virtual character an action not associated with a motion of a user's head.

More specifically, one object of the present disclosure is to provide an application processing system capable of performing toward a virtual character an action not associated with a motion of a user's head based on the detection information obtained by the head mounted display.

More specifically, one object of the present disclosure is to increase a variety of the actions toward a virtual character not associated with a motion of a user's head.

Other objects of the disclosure will be apparent with reference to the entire description in this specification.

An application processing system according to one aspect of the present invention provides an interaction with a virtual character to a user, the application processing system having one or more computer processors and being configured to output an image of a virtual space including the virtual character to a head mounted display mounted on a head of the user. In one aspect, the one or more computer processors execute computer-readable instructions to: specify a first action associated with a motion of the head of the user in the virtual space and performed toward the virtual character, based on one or more detection information items obtained by the head mounted display; and specify, in response to selection of a specific object included in the virtual space, a second action not associated with a motion of the head of the user in the virtual space and performed toward the virtual character, based on the one or more detection information items.

In the application processing system according to one aspect of the present invention, the second action is associated with a motion of a hand of the user in the virtual space.

In the application processing system according to one aspect of the present invention, the second action is associated with use of a tool by the user in the virtual space.

In the application processing system according to one aspect of the present invention, in response to the selection of the specific object, one or more character gazing points are set on the virtual character, and the second action is specified in response to the user gazing at at least one of the one or more character gazing points set on the virtual character.

In the application processing system according to one aspect of the present invention, the one or more character gazing points include a first character gazing point and a second character gazing point, the second action includes a first gazing point action and a second gazing point action, and when the first character gazing point is gazed at, the first gazing point action is specified as the second action, and when the second character gazing point is gazed at, the second gazing point action is specified as the second action.

In the application processing system according to one aspect of the present invention, the specific object is associated with a first menu item and a second menu item, the second action includes a first menu item action associated with the first menu item and a second menu item action associated with the second menu item, and when the first menu item is gazed at and then at least one of the one or more character gazing points is gazed at, the first menu item action is specified as the second action, and when the second menu item is gazed at and then at least one of the one or more character gazing points is gazed at, the second menu item action is specified as the second action.

In the application processing system according to one aspect of the present invention, the one or more computer processors specify a first primary display area in the virtual space for a first scene, and the specific object is located outside the first primary display area for the first scene.

In the application processing system according to one aspect of the present invention, the one or more computer processors specify a second primary display area in the virtual space for a second scene, and the specific object is located outside the second primary display area for the second scene.

In the application processing system according to one aspect of the present invention, the one or more computer processors generate the virtual space such that the virtual space includes the virtual character performing a reaction in response to the first action or the second action.

A method of processing an application according to one aspect provides an interaction with a virtual character to a user, the method being performed by one or more computer processors executing computer-readable instructions to output an image of a virtual space including the virtual character to a head mounted display mounted on a head of the user. The method of processing an application comprises: specifying a first action associated with a motion of the head of the user in the virtual space and performed toward the virtual character, based on one or more detection information items obtained by the head mounted display; and specifying, in response to selection of a specific object included in the virtual space, a second action not associated with a motion of the head of the user in the virtual space and performed toward the virtual character, based on the one or more detection information items.

An application processing program according to one aspect stored in a non-transitory computer-readable storage medium is configured to provide an interaction with a virtual character to a user and is executed by one or more computer processors to output an image of a virtual space including the virtual character to a head mounted display mounted on a head of the user. The application processing program causes the one or more computer processors to: specify a first action associated with a motion of the head of the user in the virtual space and performed toward the virtual character, based on one or more detection information items obtained by the head mounted display; and specify, in response to selection of a specific object included in the virtual space, a second action not associated with a motion of the head of the user in the virtual space and performed toward the virtual character, based on the one or more detection information items.

Advantages

According to the embodiments disclosed herein, a technical improvement is provided in an application processing system capable of performing toward a virtual character an action not associated with a motion of a user's head.

BRIEF DESCRIPTION OF THE DRAWINGS

In FIG. 4a, the user is in an upright position in the virtual space.

In FIG. 4b, the user is in a supine position in the virtual space.

DESCRIPTION OF THE EMBODIMENTS

Figure 1:
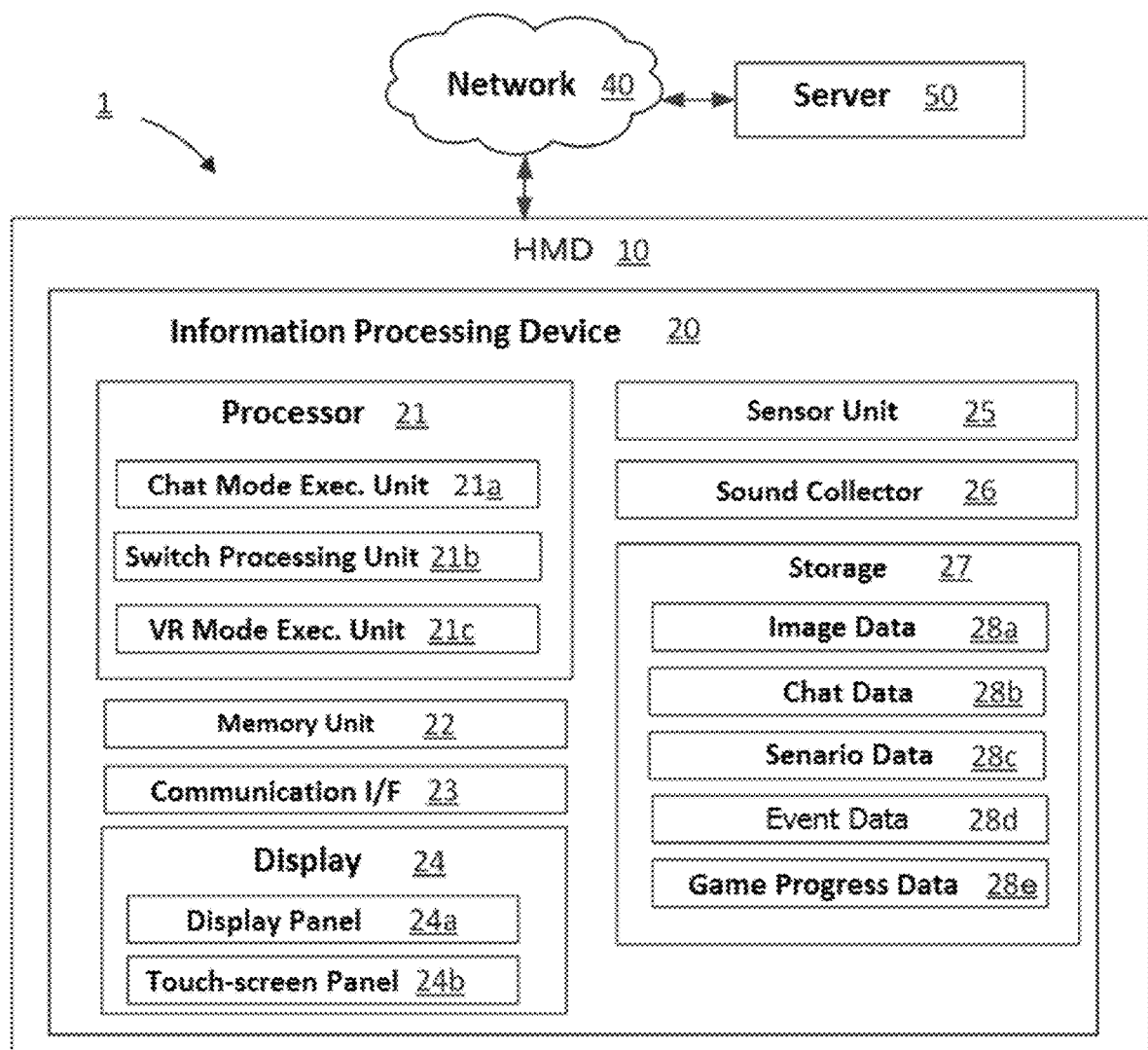
FIG. 1 is a block diagram illustrating an application processing system according to an embodiment.

Various embodiments of the disclosure will be described hereinafter with reference to the accompanying drawings. Throughout the drawings, the same or similar components are denoted by the same reference numerals.

Figure 2:
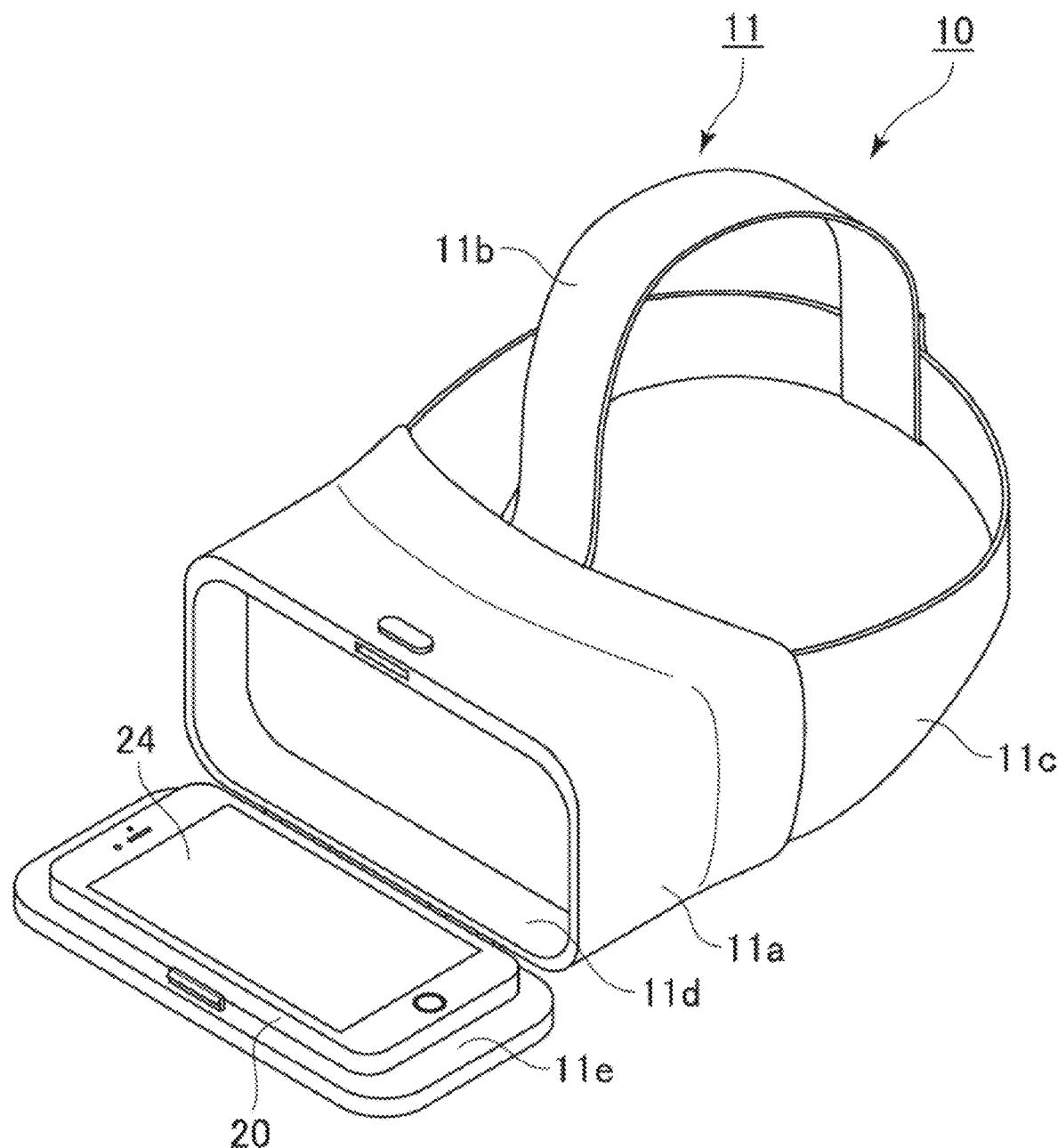
FIG. 2 is a schematic diagram showing a head mounted display usable in the application processing system of FIG. 1.
Figure 3:
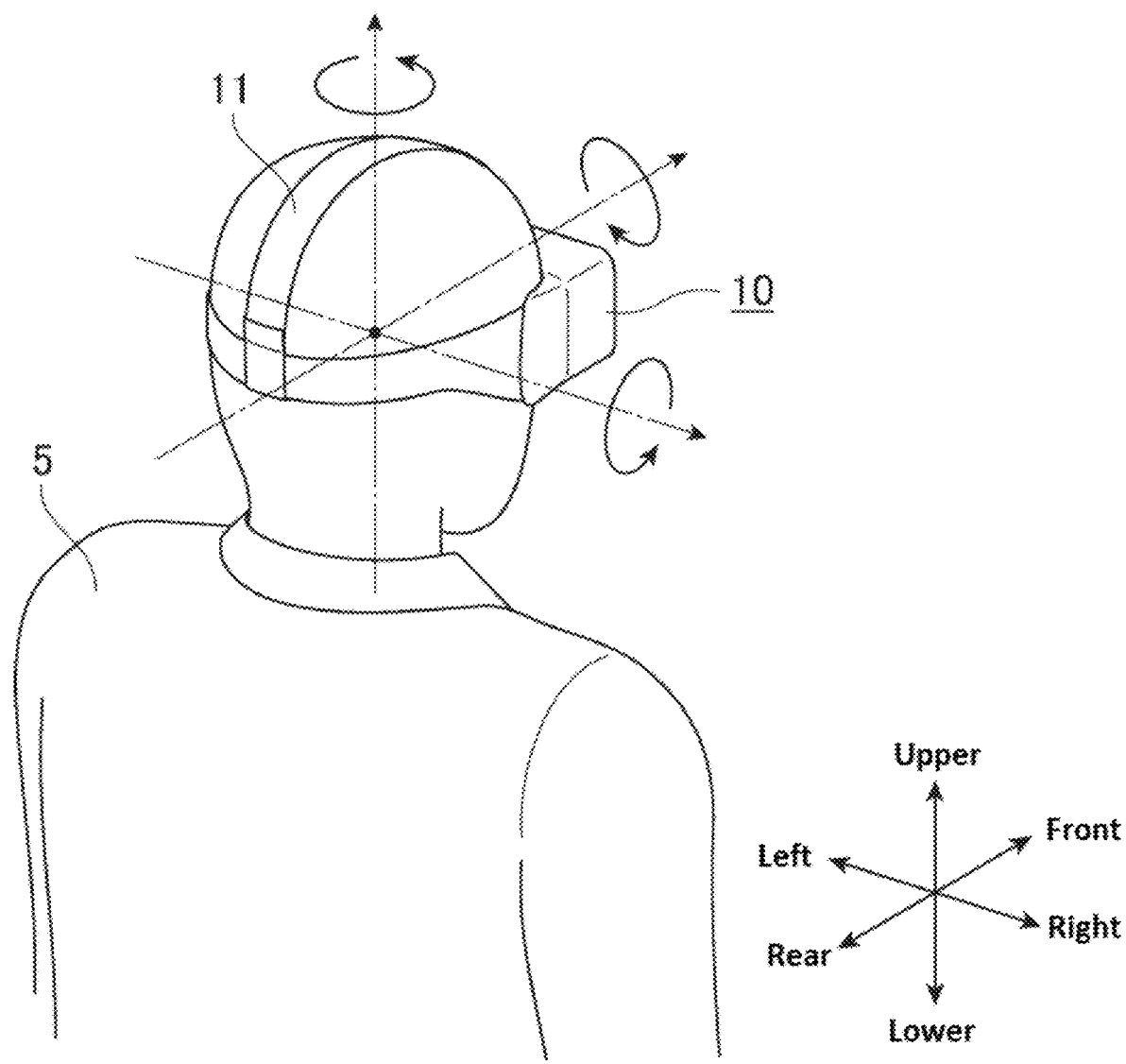
FIG. 3 is a diagram schematically showing the head mounted display worn by a user.

With reference to FIGS. 1 to 3, an application processing system according to an embodiment of the disclosure will be described. FIG. 1 is a block diagram of an application processing system 1 according to an embodiment, FIG. 2 schematically illustrates a head mounted display 10 (hereinafter referred to as "HMD 10") used in the application processing system 1, and FIG. 3 schematically illustrates the HMD 10 worn by a user 5.

The application processing system 1 according to an embodiment provides various applications by executing application processing programs. One example of the application is a video game. Using the application processing system 1, the user is able to play various games using a game content(s). Game contents are electronic data that are used in a game realized by the application processing system 1 and can be acquired, owned, used, managed, exchanged, integrated, reinforced, sold, abandoned, or donated in the game by users. The game contents may be, for example, a card, an item, a virtual currency, a ticket, a character, an avatar, level information, status information, parameter information (health, attack, and the like), capacity information, skills, abilities, magic, jobs, and any other various electronic data usable in the game. However, the types of game contents usable in the application processing system 1 and the way the game contents are used may not be limited to those described in this specification. For example, the application processing system 1 can realize a game in which a virtual character and the user interact in a virtual space. The game realized by the game processing system 1 has a first mode and a second mode. An example of the first mode is a chat mode, and an example of the second mode is a VR mode. The first mode and the second mode will be described later.

The application processing system 1 may be configured to process an application other than games. The application processing system may be configured to provide an application for simulation in the field of driving or other fields, an application for training in the field of medicine or other fields, an application for experiencing products and services, an application for appreciating films or other various entertainment contents, and other various applications.

The application processing system 1 includes the HMD 10 and a server 50. The HMD 10 and the server 50 are communicably interconnected over a network 40.

As shown in FIG. 2, the HMD 10 includes an attachment 11 that is to be fitted on a human head and an information processing device 20 attached to the attachment 11.

The attachment 11 includes a goggle-like casing 11*a* having an opening 11*d* formed therein, a first belt 11*b* and a second belt 11*c* attached to the casing 11*a*, and a cover 11*e*. The cover 11*e* is attached to the casing 11*a* such that it is openable and closable. An opening 11*d* is formed in a front portion of the casing 11*a*. FIG. 2 shows the state where the cover 11*e* is open. When the HMD 10 is used, the cover 11*e* is closed so as to close the opening 11*d*.

The information processing device 20 is detachably provided on an inner side of the cover 11*e* of the HMD 10. The information processing device 20 includes a display 24. The information processing device 20 is attached to the cover 11*e* such that the display 24 faces the inside of the casing 11*a* when the cover 11*e* is closed. The information processing device 20 is attached to the attachment 11 when the HMD 10 is used. When the HMD 10 is not used, the information processing device 20 is detached from the attachment 11.

In the illustrated embodiment, the information processing device 20 is a smartphone. In addition to the smartphone, the information processing device 20 may be a mobile phone, a tablet, a personal computer, an electronic book reader, a wearable computer, a game console, or any other information processing devices. When detached from the HMD 10, the information processing device 20 may be used for its originally intended purpose.

The information processing device 20 includes the display 24 as described above. In the illustrated embodiment, when the information processing device 20 is mounted on the attachment 11, the display 24 serves as an apparatus for displaying an image in the HMD 10. Accordingly, when the HMD 10 is used to play a game, the display 24 displays a virtual space and a virtual character(s) of the game, and other images related to the game.

The shape of the attachment 11 is not limited to the illustrated goggle type. The attachment 11 may include a structure of any shape that moves following the movement of the head of the user who wears the HMD, and the structure can place the display 24 in front of the user's eye(s) while the HMD is worn. For example, the attachment 11 may have an eyeglasses-like shape, a hat-like shape, or a helmet-like shape. In order to enhance user's sense of immersion, the HMD 10 is preferably configured such that the display 24 covers both eyes of the user when the attachment 11 is attached to the head of the user.

When the HMD 10 is used, the HMD 10 is mounted on the head of the user 5 via the attachment 11, as shown in FIG. 3. The information processing device 20 is mounted on the attachment 11 attached to the head of the user 5.

The information processing device 20 will be further described referring again to FIG. 1. As illustrated, in one embodiment, the information processing device 20 includes a computer processor 21, a memory unit 22, a communication I/F 23, a display 24, a sensor unit 25, a sound collector 26, and a storage 27.

The computer processor 21 is a computing device which loads various programs realizing an operating system and game logics from the storage 27 or other storage into the memory unit 22 and executes instructions included in the loaded programs. The computer processor 21 is, for example, a CPU, an MPU, a DSP, a GPU, or any other computing devices. The processor 21 may be realized by means of an integrated circuit such as ASIC, PLD, FPGA, MCU, or the like. Although the computer processor 21 is illustrated as a single component in FIG. 1, the computer processor 21 may be a collection of a plurality of physically separate computer processors. In this specification, a program or instructions included in the program that are described as being executed by the computer processor 21 may be executed by a single computer processor or executed by a plurality of computer processors distributively. Further, a program or instructions included in the program executed by the computer processor 21 may be executed by a plurality of virtual computer processors distributively.

The memory unit 22 is used to store instructions that may be executed by the computer processor 21 and other various data. At least a part of the application processing program in the embodiment is loaded into the memory unit 22 at appropriate timings in accordance with the progress of the game. The memory unit 22 is, for example, a main storage device (main memory) that the computer processor 21 is able to access at high speed. The memory unit 22 may be, for example, a RAM such as a DRAM or an SRAM.

The communication I/F 23 may be implemented as hardware, firmware, or communication software such as a TCP/IP driver or a PPP driver, or a combination thereof. The information processing device 20 is able to transmit and receive data to and from other devices via the communication I/F 23.

The display 24 includes a display panel 24a and a touch-screen panel 24b. For example, the display panel 24a is laminated on an upper surface or lower surface thereof with the touch-screen panel 24b. The display panel 24a is a liquid crystal panel, an organic EL panel, an inorganic EL panel, or any other display panel capable of displaying an image. The touch-screen panel 24b is configured to detect touch operations performed by the user. The touch-screen panel 24b can detect various touch operations such as tapping, double tapping, and dragging performed by the user.

The sensor unit 25 includes one or more sensors. The sensor unit 25 includes, for example, at least one selected from the group consisting of a gyro sensor, an acceleration sensor, and a geomagnetic sensor. The sensor unit 25 may include an eye tracking sensor that directly detects user's eye movements. The eye tracking sensor is, for example, an eye-gaze tracking sensor that emits a near-infrared light beam into the iris and detects its reflected light. The position and the orientation of the HMD 10 mounted on the head of the user 5 are specified based on detection information obtained by the sensor unit 25. The position and the orientation of the HMD 10 are calculated as the position in the three-dimensional orthogonal coordinate system and the angle around each axis. The three-dimensional orthogonal coordinate system is, for example, an orthogonal coordinate system composed of a roll axis along the front-rear direction, a yaw axis along the vertical direction, and a pitch axis along the left-right direction. At least some of the various sensors included in the sensor unit 25 may be mounted on the attachment 11 and/or a member other than the attachment 11 different from the information processing device 20.

The sound collector 26 is capable of collecting sound and voice. The sound collector 26 is, for example, a microphone. Sound and voice of the user 5 are detected based on audio information collected by the sound collector 26.

The storage 27 is an external storage device accessed by the computer processor 21. The storage 27 is, for example, a magnetic disk, an optical disk, a semiconductor memory, or various other storage device capable of storing data. Various programs such as an application processing program are stored in the storage 27. The storage 27 may also store various data used in a game(s). At least some of the programs and various data that can be stored in the storage 27 may be stored in a storage that is physically separated from the information processing device 20.

In the illustrated embodiment, the storage 27 stores image data 28a, chat data 28b, scenario data 28c, event data 28d, game progress data 28e, and various other data necessary for progress of the game.

The image data 28a includes data for drawing a background in a virtual space where a game is executed, data for drawing a virtual character, and data for drawing an object other than the virtual character used in the game. The image data 28a may include information about the position of an object in the virtual space. In the image data 28a, the above data may be associated with each other for each scenario, event, or scene.

The chat data 28b includes data for drawing an icon of a virtual character, data for drawing an icon of the user 5, data for specifying a plurality of messages from a virtual character, data representing options of a response message to the plurality of messages from the virtual character, and any other data used in the chat. The plurality of messages from the virtual character may be defined in a tree structure in which nodes corresponding to each message are interconnected by arcs. In the tree structure, for example, more than one arc extends from a start message which is the root node existing at the top, and each arc is connected to a node situated at a lower level. Arcs also extend from the lower nodes and are connected to nodes at a further lower level. The nodes at the lower levels each correspond to a possible message from a virtual character that may be displayed after the start message. The chat data 28b may include a mode switch condition that is a condition for starting a mode switch from the chat mode to the VR mode. The mode switch condition may include, for example, that the elapsed time since the game was started in the chat mode is equal to or longer than a predetermined length of time, that a chat has progressed to a terminal node of messages having the tree structure, and any other conditions. The chat data 28b may include data indicating a message that is to be displayed when the chat mode is resumed after selection of a switch object is not completed.

The scenario data 28c includes data defining a scenario to be experienced by the user 5 in the game. When there are two or more scenarios to be experienced by the user 5 in the game, the scenario data 28c may be defined for each of the scenarios. The scenario data 28c may be defined as a collection of events. The events included in the scenario data 28c may be defined in a tree structure in which nodes corresponding to each event are interconnected by arcs. In the tree structure, for example, more than one arc extends from a start event which is the root node existing at the top, and each arc is connected to a node situated at a lower level. Arcs also extend from the lower nodes and are connected to nodes at a further lower level. The nodes at the lower levels in a scenario each correspond to a possible event that may occur after the start event in the scenario. In the scenario data 28c, the above data may be associated with each other for each scenario.

The event data 28d define events constituting the scenario data 28c. The event data 28d may be defined as a collection of data for specifying a plurality of actions of a virtual character in a game. The plurality of actions of a virtual character may be defined in a tree structure in which nodes corresponding to each action are interconnected by arcs. In the tree structure, for example, more than one arc extends from a start action which is the root node existing at the top, and each arc is connected to a node situated at a lower level. Arcs also extend from the lower nodes and are connected to nodes at a further lower level. The nodes at the lower levels in an event each correspond to a possible action that may occur after the start action in the event. The event data 28d may include, for each node, video image data that corresponds to the action corresponding to the node, data related to actions that may be performed toward a virtual character by the user, and other data related to actions of a virtual character.

The game progress data 28e includes data used for managing the progress of the game. The game progress data 28e may be updated as the game progresses. The game progress data 28e may include, for example, data related to likability of a virtual character to a user, data related to points acquired by the user in the game, and any other various types of data that may vary depending on the progress of the game.

The components and functions of the information processing device 20 shown in FIG. 1 are examples. The information processing device 20 applicable to the invention may include various components that are not shown. For example, the information processing device 20 may be provided with a speaker for outputting sound effect of the game and sound and voice of the virtual character.

The components and functions of the information processing device 20 shown in FIG. 1 are examples. The information processing device 20 applicable to the invention may include various components that are not shown. For example, the information processing device 20 may be provided with a speaker for outputting sound effect of the game and sound and voice of the virtual character.

Next, functions of the HMD 10 will be described. In the illustrated embodiment, various functions of the HMD 10 are realized by the computer processor 21 of the information processing device 20 executing computer readable instructions. The instructions executed by the computer processor 21 include instructions included in the application processing program according to an embodiment.

When the application processing program according to the embodiment is executed by the computer processor 21, the game having the first mode and the second mode different from the first mode is realized in the application processing system 1. The game realized in the application processing system 1 may further have a mode other than the first mode and the second mode.

In the first mode of the game realized in the application processing system 1, processing relating to the game is performed based on first detection information obtained by the information processing device 20 when the HMD 10 is not mounted on the user 5, that is, when the information processing device 20 is detached from the attachment 11. The first detection information may include information concerning a touch operation of the user 5 detected via the touch-screen panel 24b of the information processing device 20, information concerning voice of the user detected by the sound collector 26, and any other detection information that can be obtained in the information processing device 20 when the HMD 10 is not attached to the user 5. In the first mode, the user 5 is able to perform operations relating to the game using the information processing device 20 that is removed from the attachment 11. Since the first mode is designed such that the game is played when the HMD 10 is not mounted on the user 5, the display 24 displays, in an embodiment, a non-stereoscopic image.

In the second mode of the game realized in the application processing system 1, the game is played using second detection information obtained by the HMD 10 attached to the head of the user 5. The second detection information is, for example, detection information obtained by the sensor unit 25. Based on the second detection information, head tracking information for determining the position and the orientation of the head of the user 5 is calculated. A process for progressing the game in the second mode may be performed based on, for example, the head tracking information calculated based on the second detection information. The process for progressing the game in the second mode may be performed using any other information in addition to the head tracking information. In preparation for playing the game in the second mode, the user 5 attaches the information processing device 20 to the attachment 11, and places the attachment 11 with the information processing device 20 on his/her head. As described above, the second mode is designed such that the game is played while the HMD 10 is worn by the user 5, so in one embodiment, a stereoscopic image that is stereoscopically viewed by the user 5 is displayed on the display 24 in the second mode. The stereoscopic image is displayed on the display 24 by, for example, a parallax barrier method. In the parallax barrier method, a left eye image and a right eye image are displayed on the display 24. The stereoscopic image is a set of images including the left eye image and the right eye image configured to be stereoscopically viewed when displayed on the display utilizing the parallax of the left and right eyes.

The first mode is, for example, a chat mode. The chat mode is an example of the first mode. The chat mode provides a function that allows the user to chat with a virtual character via a text message. In the first mode, the user can experience interaction with a virtual character by chatting with the virtual character. Processes performed in the chat mode will be described later in detail. Here, the interaction means, in a broad sense, that the virtual character reacts to an action made by the player. The interaction with the virtual character includes an interaction performed as communication with the virtual character such as conversation with the virtual character. In this specification, an interaction performed as communication with a virtual character may also be referred to as a communicative interaction. In addition to the communicative interaction, the interaction with a virtual character may include a battle against the virtual character, a cooperative play to play the game in cooperation with the virtual character, and other interactions with a virtual character. In this specification, an interaction performed as a battle against a virtual character may be referred to as a battle interaction. In the specification, an interaction performed as a cooperative play with a virtual character may be referred to as a cooperative interaction.

The second mode is, for example, the VR mode. The VR mode provides a function that allows the user to perform various interactions with a virtual character appearing in the virtual space displayed on the display of the information processing device 20. Processes performed in the VR mode will be described later in detail. The VR mode is an example of the second mode, and the second mode may include any game mode in which a process for progressing the game is performed using the head tracking information.

In one embodiment, a game having the first mode and the second mode that is realized by the application processing system 1, may be a game in which a user performs interactions with a virtual character other than the communicative interaction. In the game realized by the application processing system 1, the communicative interaction may not be performed. The game according to one embodiment is played in a two-dimensional space in the first mode and played in a three-dimensional space in the second mode. The game according to one embodiment is played in a three-dimensional space in the first mode, whereas in the second mode, the game is played in a three-dimensional space displayed in a different manner than the three-dimensional space of the first mode (or in a three-dimensional space configured in a different manner than the three-dimensional space of the first mode). In one embodiment, the game realized by the application processing system 1 may use a game content(s) common to the first mode and the second mode. A parameter associated with the game content may be carried over to/from the first mode from/to the second mode. For example, when a value of the parameter of the specific game content is changed during playing the game in the first mode and thereafter the game switches to the second mode, the specific game content with the changed parameter is used in the second mode. In one embodiment, a value of a parameter of a specific game content may be changed when the game is switched from the first mode to the second mode and/or when the game is switched from the second mode to the first mode. The parameter change of the game content may be a change that is advantageous for the player 5 to progress the game or may be a change that is disadvantageous for the player 5. In one embodiment, a game play result in the first mode may be reflected in the game played in the second mode, and a play result in the second mode may be reflected in the game played in the first mode. For example, experience points of the player 5 acquired in the first mode may be carried over to the second mode.

As described above, the first mode and the second mode of the game realized in the application processing system 1 are distinguished from each other. That is, the first mode is different from the second mode. In one embodiment, when the game implemented in the application processing system 1 is played in the first mode, the HMD 10 is not attached to the head of the user 5, whereas when the game is played in the second mode, the HMD 10 is attached to the head of the user 5. In the first mode, the game is processed based on the first detection information obtained by the information processing device 20 that is not attached to the head of the user 5, whereas in the second mode, the game is processed based on the second detection information obtained by the HMD 10 that is attached to the head of the user 5.

In one embodiment, a stereoscopic image is displayed on the display 24 in the second mode, whereas in the first mode, a non-stereoscopic image is displayed on the display 24 as described above. At least an image of a virtual character among the images used in the game is displayed as a stereoscopic image in the second mode, whereas in the first mode, the image of the virtual character is displayed as a non-stereoscopic image.

In one embodiment, a process of progressing the game in the first mode is performed without using the head tracking information calculated based on the second detection information, whereas in the second mode, a process of progressing the game is performed based on the head tracking information.

In one embodiment, the process of progressing the game in the first mode is performed in accordance with a touch operation detected via the touch-screen panel 24*b*, whereas in the second mode, the process is not performed in accordance with the touch operation on the touch-screen panel 24*b*.

In one embodiment, in the case where an interaction with a virtual character is provided in a game implemented in the application processing system 1, the interaction with the virtual character is provided based on the first detection information obtained by the information processing device 20 that is not attached to the head of the user 5 in the first mode. In the second mode, the interaction with the virtual character is provided based on the second detection information obtained by the HMD 10 attached to the head of the user 5.

Figure 5:
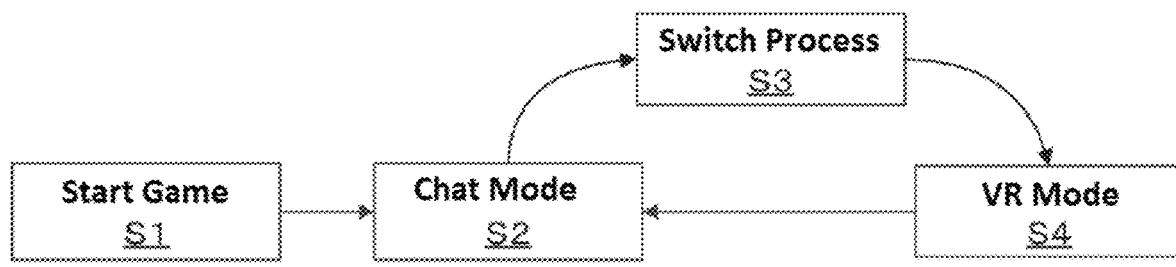
FIG. 5 is a diagram illustrating a mode switch in the game processed by the application processing system according to an embodiment.

After the game is started, it is possible to switch between the first mode and the second mode which are distinguished as described above. With reference to FIG. 5, the outline of the mode switch of the game processed by the application processing system 1 will be described. As shown, when the game is started in step S1, the chat mode, which is the first mode, is started in step S2. In this chat mode, upon start of a switching process for switching to the VR mode which is the second mode, the process shifts to step S3 and the switching process to the second mode is carried out. When the switching process is completed, the VR mode, which is the second mode, is started in step S4. When the VR mode is terminated or interrupted, a return process to the chat mode is performed.

Functions realized by the computer processor 21 will be now described more specifically. The computer processor 21 functions as a chat mode execution unit 21*a*, a switch processing unit 21*b*, and a VR mode execution unit 21*c* by executing computer readable instructions. At least some of the functions that can be realized by the computer processor 21 may be realized by a computer processor other than the computer processor 21 of the game system 1. For example, at least some of the functions realized by the computer processor 21 may be realized by a computer processor mounted on the server 50.

The chat mode execution unit 21*a* performs processing for providing the game in the chat mode as the first mode by executing an application processing program according to an embodiment. The chat mode executing unit 21*a* implements a function that allows the user 5 to chat with a virtual character. After the user 5 logs in to the chat mode, the chat mode execution unit 21*a* displays a message from the virtual character and a message input or selected by the user 5 on the display 24, and enables the user 5 to chat with the virtual character. Following the message from the virtual character, the chat mode execution unit 21*a* may display on the display 24 several response options for the user 5 to respond to the message. A message from the user 5 is specified from the response options in accordance with an operation of the user 5, and the specified message is displayed as a message from the user 5 following the message from the virtual character. The user 5 can select a desired one from the displayed response options by touching the touch-screen panel 24*b*. The message from the virtual character and the response options for the user to respond to the message can be specified by referring to the chat data 28*b* in accordance with the application processing program. The message from the virtual character may be displayed together with an image of the virtual character, and the message from the user 5 may be displayed together with an image of the user 5. The message from the virtual character may include a message for prompting the user to switch to the VR mode which is the second mode, a message for allowing the user 5 to select an option(s) for setting of the VR mode, and any other message associated with the VR mode.

In the chat mode, a switch start object for starting switching to the VR mode as the second mode is displayed in accordance with the progress of the chat. Display of the switch start object is performed in accordance with the application processing program when the mode switch condition is satisfied. When it is detected based on the detection signals from the touch-screen panel 24b or other user interfaces that the switch start object has been selected, the process for switching to the VR mode, which is the second mode, is started.

The switch processing unit 21b performs the process for switching from the first mode to the second mode. The switch process may include displaying a guidance on the display 24 to prompt a user to attach the information processing device 20 to the attachment 11, and displaying the switch object on the display 24 such that it can be selectable by the user's gazing. After displaying the switch object, the switch processing unit 21b receives a detection signal from the sensor unit 25 or another sensor and determines whether the switch object has been selected by gazing based on the detection signal. For the determination, the switch processing unit 21b calculates the position and orientation of the HMD 10 based on the detection signal from the sensor unit 25, and specifies the position (point) at which the user 5 gazes based on the calculated position and orientation of the HMD 10. The gazing point can be specified by various known methods. For example, the gazing point may be specified based on the detection signal of the eye tracking sensor. For example, the switch processing unit 21b measures the duration of time (gazing duration) during which the gazing point is on the switch start object, and when the gazing duration reaches a predetermined length, the switch processing unit 21b determines that the selection of the switch start object has been completed. After the switch processing unit 21b determines that the selection of the switch object has been completed, it starts the VR mode which is the second mode.

The VR mode execution unit 21c generates a virtual space including the virtual character and other objects and outputs image information for depicting the virtual space to the display 24. The VR mode execution unit 21c can generate the image information of the virtual space 60 corresponding to a scene determined in accordance with the progress of the game.

Figure 4A:
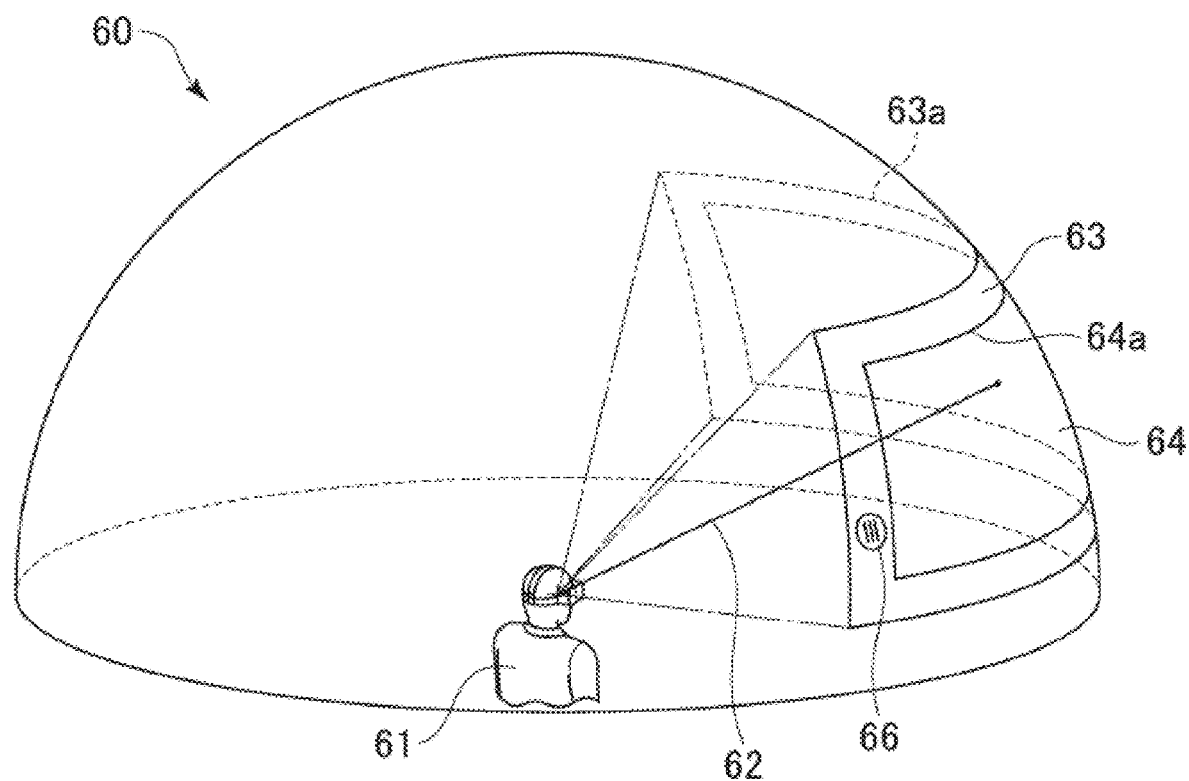
FIG. 4a schematically illustrates a virtual space in the application processing system according to an embodiment.

The virtual space generated by the VR mode execution unit 21 will now be described with further reference to FIG. 4a. FIG. 4a schematically shows the virtual space 60 generated by the VR mode execution unit 21c. FIG. 4a shows the virtual space 60 initialized for a first scene. The VR mode execution unit 21c specifies the position and the reference line of gaze of a user 61 in the virtual space 60 based on the initial settings for the first scene and also specifies an area of the virtual space 60 within a predetermined region centered at the reference line of gaze 62 as the initial display area 63. The initial display area 63 is, for example, a region within a predetermined angle of view centered at the reference line of gaze 62. The initial display area 63 is partitioned from the hidden area with a borderline 63a. When the processing for the first scene is started, the VR mode execution unit 21c generates image information for depicting the initial display area 63 of the virtual space 60 and outputs the generated image information to the display 24. Based on the image information generated in this way, the image of the virtual space 60 corresponding to the initial display area 63 is displayed on the display 24. For the generation of the image information, for example, the image data 28a, the scenario data 28c, the event data 28d, the game progress data 28e, and other data stored in the storage 27 may be used.

When a movement of the head of the user 5 is detected by the HMD 10 after the processing for the first scene is started in the VR mode, the VR mode execution unit 21c moves the reference line of gaze 62 so as to follow the detected movement of the head of the user 5 and specifies a region within the predetermined angle of view centered at the moved reference line of gaze 62 as a new display area. In this way, the VR mode execution unit 21c updates the display area as necessary in accordance with the movement of the head of the user 5 detected by the HMD 10 and outputs to the display 24 an image of the virtual space 60 corresponding to the updated display area. As a result, the image of the virtual space 60 displayed on the display 24 varies in accordance with the display area. The user 5 can view the image of the virtual space 60 that varies in accordance with the movement of his/her head. When the user 61 moves in the virtual space 60, the direction of the reference line of gaze 62 varies in accordance with the position of the user 61 in the virtual space 60.

The virtual space 60 includes a primary display area 64. The primary display area 64 is an example of a first primary display area. The primary display area 64 is located at a predetermined position in the virtual space 60 set for each scene. The primary display area 64 is partitioned from the other area with a borderline 64a. The primary display area 64 includes, for example, a position at which the user 5 tends to gaze in each scene. The primary display area 64 is located within the initial display area 63 determined based on the initial settings for each scene. The primary display area 64 for a scene is set such that the initial display area 63 determined based on the initial settings for the scene includes at least part of an object representing the virtual character with which the user interacts. The primary display area 64 may constitute either a part or the entirety of the initial display area 63. For the first scene shown in FIG. 4a, the primary display area 64 is located around the reference line of gaze 62 of the user 61 in the upright position.

The virtual space 60 includes the object for the virtual character and other various objects. The objects included in the virtual space 60 may include a specifying object that can be selected by gazing of the user 5. As one example of such a specific object, a menu object 66 is shown in FIG. 4a.

The menu object 66 may be associated with one or more menu items that can be selected by gazing of the user 5. Each of the one or more menu items may be associated with an action of the user 61 in the virtual space 60. The menu items included in the menu object 66 may be associated with actions not associated with a movement of the head of the user 61 in the virtual space 60. Such actions include, for example, a hand action related to a movement of a hand of the user 61 in the virtual space 60 and a tool action related to use of a tool by the user 61 in the virtual space 60. One example of the tool action is a photograph action in which the user 61 takes a photograph with a camera in the virtual space 60. When the menu object 66 is associated with a plurality of menu items, it is possible that only a part of the menu items is made selectable in accordance with the progress of the game.

As shown in FIG. 4a, the menu object 66 is located at a position not included in the primary display area 64. In other words, the menu object 66 is located outside the primary display area 64. The menu object 66 may be displayed either inside or outside the initial display area 63.

Figure 4B:
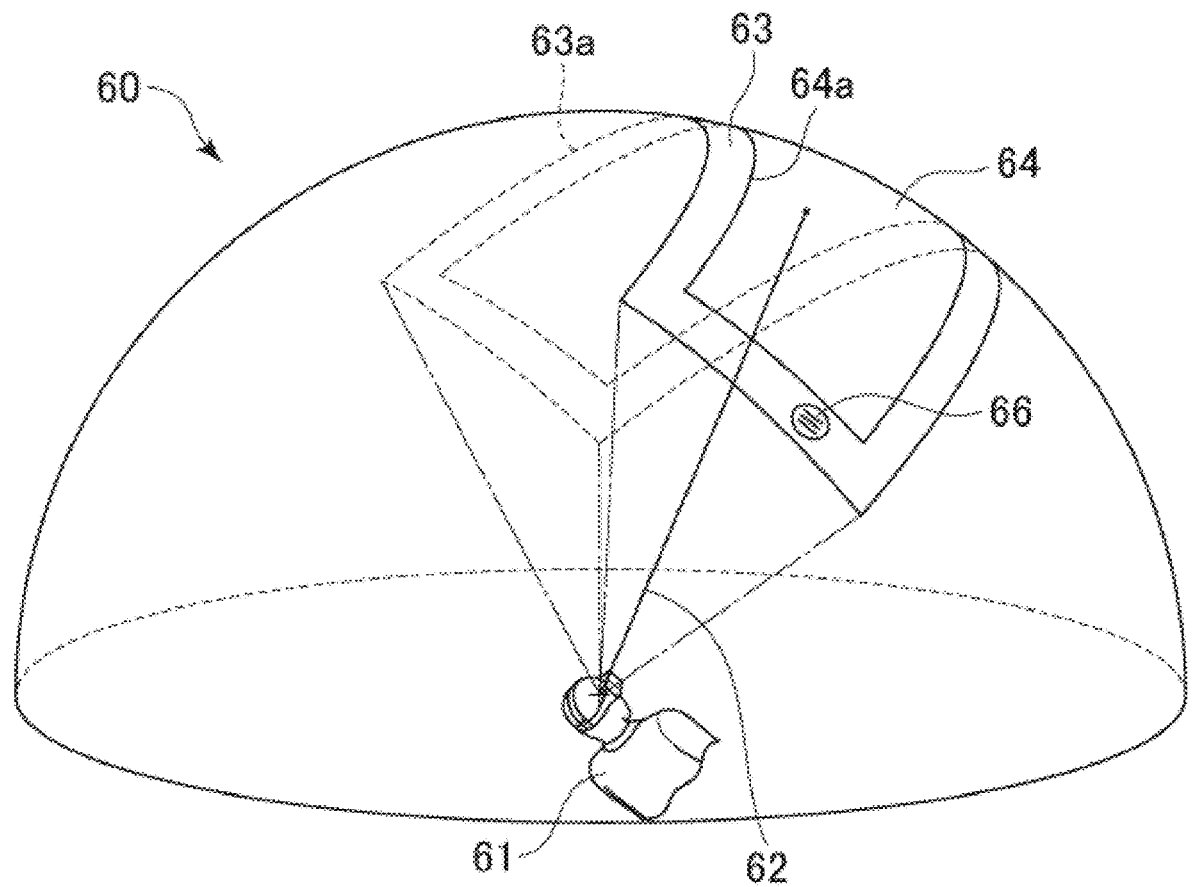
FIG. 4b schematically illustrates the virtual space in the application processing system according to an embodiment.

FIG. 4b shows the virtual space 60 for a second scene. The second scene is a game scene different from the first scene. The second scene is performed before or after the first scene. As shown, for the second scene, the primary display area 64 is located around the reference line of gaze 62 of the user 61 in the supine position. In the second scene, the menu object 66 is also located outside the primary display area 64.

The VR mode execution unit 21c displays an image of the virtual character in the virtual space in accordance with the application processing program and realizes interactions between the virtual character and the user 5. The VR mode execution unit 21c determines an action of the virtual character in the virtual space in accordance with the application processing program and generates image information and audio information corresponding to the action of the virtual character. The image information is output to the display 24, and the audio information is output to the speaker of the HMD 10. Thus, a motion image in which a virtual character moves in the virtual space is displayed on the display 24, and voice and sound corresponding to the movement of the virtual character are output from the speaker. For example, when the virtual character speaks to the user 5, a motion image in which the head and mouth of the virtual character move is displayed on the display 24, and voice corresponding to words which the virtual character speaks is output from the speaker. For the generation of the image information and the audio information corresponding to the action of the virtual character, for example, the image data 28a, the scenario data 28c, the event data 28d, the game progress data 28e, and other data stored in the storage 27 may be used. In one embodiment, the user 5 interacts with the same virtual character in the VR mode and the chat mode. For example, a virtual character appearing in the VR mode has the same name as a virtual character appearing in the chat mode, and they have common appearance such that they can be recognized as the same character. It should be noted that the image of the virtual character is displayed as a stereoscopic image in the VR mode, whereas the image of the virtual character is displayed as a non-stereoscopic image in the chat mode, so that the images of the virtual character are different between the VR mode and the chat mode. However, such difference in representation format does not affect the identity of virtual characters.

Further, the VR mode execution unit 21c may specify an action of the user 61 in the virtual space 60 based on the detection signals from the sensor unit 25. The action of the user 61 in the virtual space 60 is, for example, an action of the user 61 toward the virtual character appearing in the virtual space 60. The action of the user 61 in the virtual space 60, which is a virtual action in the virtual space 60, is either identical to or different from the body motion of the user 5 in the actual space or the movement of the user 5 in the actual space.

The actions of the user 61 in the virtual space 60 include first actions associated with a movement of the head of the user 61 and second actions not associated with a movement of the head of the user 61. The first actions associated with a movement of the head of the user 61 in the virtual space 60 include an action of nodding of the user 61 in the virtual space 60, an action of shaking the head of the user 61 in the virtual space 60, and any other actions associated with a movement of the head of the user 61 in the virtual space 60.

The VR mode execution unit 21c calculates the position and the orientation of the HMD 10 based on the detection information obtained by the sensor unit 25 provided on the HMD 10 attached to the head of the user 5, thereby to specify the movement of the head of the user 5 in the actual space.

The VR mode execution unit 21c detects the movement of the head of the user 5 in the actual world based on one or more items of the detection information obtained by the HMD 10, and specifies an action identical to or corresponding to the detected movement of the head of the user 5 in the actual world as the first action of the user 61 in the virtual space 60. For example, when the motion of nodding of the user 5 is detected, the action of nodding of the user 61 (in the virtual space 60) is specified as the first action of the user 61 in the virtual space 60. When the virtual space 60 is displayed on the display 24 as an image viewed from the user's own point of view, the first action of the user 61 in the virtual space is not included in the image of the virtual space 60.

The second actions of the user 61 in the virtual space 60 are not associated with the movement of the head of the user 61 in the virtual space 60. The second actions are associated with the movement of a body part of the user 61 other than the head in the virtual space 60, such as the movement of a hand of the user 61. The second actions include an action of "patting" made by the user 61 in the virtual space 60, an action of "poking" made by the user 61 in the virtual space 60, and any other actions associated with a movement of a body part of the user 61 other than the head in the virtual space 60. The action of "patting" is an example of a first gazing point action, and the action of "poking" is an example of a second gazing point action.

In an embodiment, the VR mode execution unit 21c specifies a second action in response to selection of the menu object 66. The VR mode execution unit 21c can detect that the menu object 66 is selected, based on the gazing point calculated based on the detection signals of the HMD 10. For example, the VR mode execution unit 21c can determine whether the selection of the menu object 66 is completed, based on whether the gazing point resides on the menu object 66 for more than a predetermined amount of time. For example, when the gazing point resides on the menu object 66 for more than a predetermined amount of time, it is determined that the selection of the menu object 66 is completed.

In the case where the menu object 66 includes a plurality of menu items, the VR mode execution unit 21c can detect that one of the plurality of menu items is selected when the gazing point resides on the menu item for more than a predetermined amount of time.

When the VR mode execution unit 21c detects selection of the menu object 66 or selection of one of the menu items included in the menu object 66, the VR mode execution unit 21c sets an action corresponding to the selected menu object 66 or the selected menu item as the selected action performed by the user 61 toward the virtual character. As described above, the menu items may include a menu item corresponding to a hand action related to a movement of a hand of the user 61 in the virtual space 60 and a menu item corresponding to a photograph action related to photographing in the virtual space 60. When a menu item associated with the hand action is selected, the VR mode execution unit 21c sets the hand action as the selected action performed toward the virtual character.

When the second action is set, the VR mode execution unit 21c may set one or more character gazing points on the virtual character. When at least one gazing point is selected from the one or more gazing points, the VR mode execution unit 21c can specify the action toward the virtual character based on the selected gazing point and the selected action. For example, when a menu item corresponding to a hand action is selected and a gazing point set on the head of the virtual character is selected, the action of patting the head of the virtual character is specified, and this specified action is performed in the virtual space 60.

The VR mode execution unit 21c can determine an action (a reaction) of the virtual character in the virtual space in response to the action of the user 61. The VR mode execution unit 21c generates image information for displaying the action of the virtual character determined in response to the action of the user 5 and outputs the generated image information as a stereoscopic image to the display 24. Thus, an image of the virtual character performing the action specified in response to the action of the user 5 is displayed on the display 24. In this way, the VR mode execution unit 21c determines the action (the reaction) of the virtual character responding to the action of the user 61 and causes the image information of the virtual character corresponding to the determined action to be displayed on the display 24. As described above, in the VR mode, an interaction is realized between the user 5 and the virtual character displayed as a stereoscopic image.

When a termination condition is satisfied, the VR mode execution unit 21c performs a termination process to terminate the VR mode. The termination condition may include, for example, that a predetermined duration of time (for example, one minute) has elapsed from the start of the VR mode, that an operation for termination has been detected, that the last event included in the scenario being executed in the VR mode has ended, and any other conditions. The termination process performed when the termination condition is satisfied may include, displaying, on the display 24, a guidance for prompting the player to remove the information processing device 20 from the attachment 11, and displaying a login screen to log in to the chat mode which is the first mode.

Figure 6:
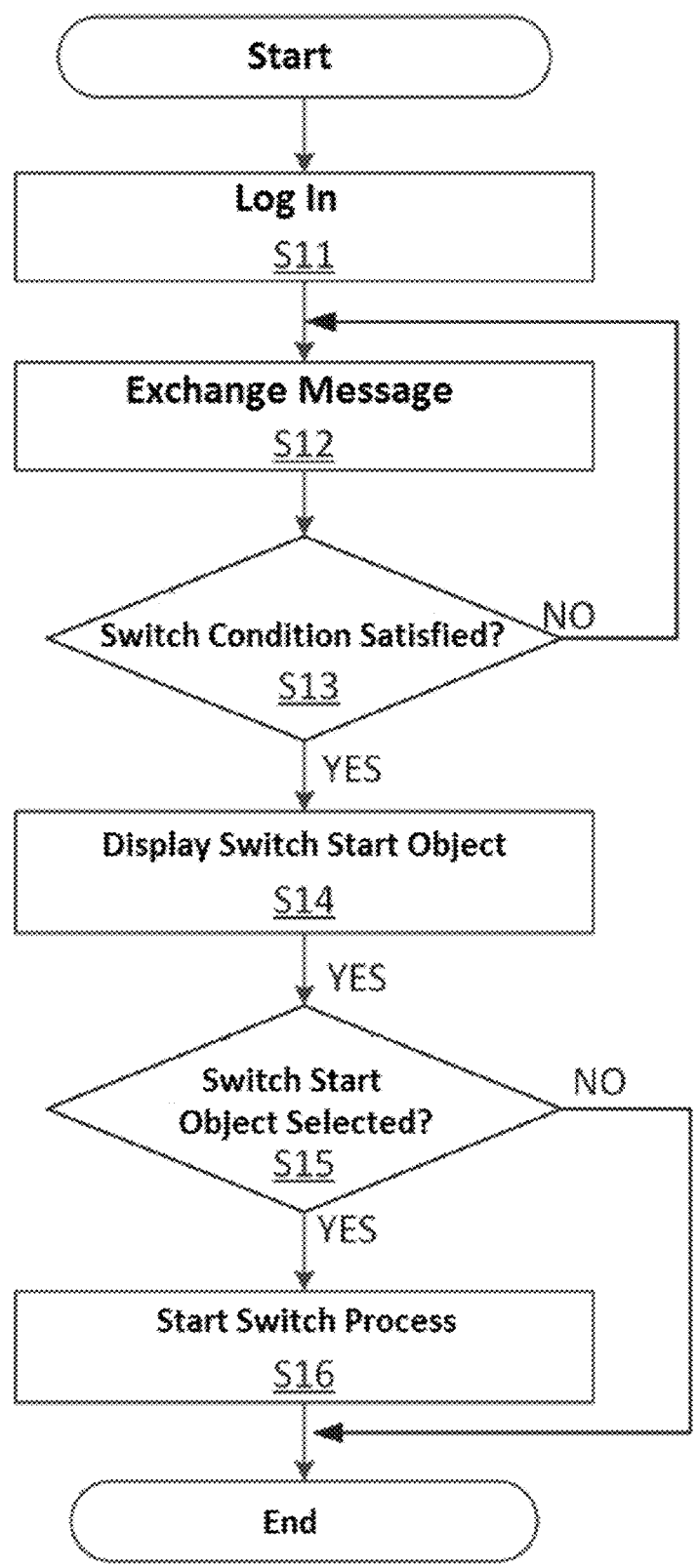
FIG. 6 is a flowchart of a process in a chat mode according to an embodiment.
Figure 7:
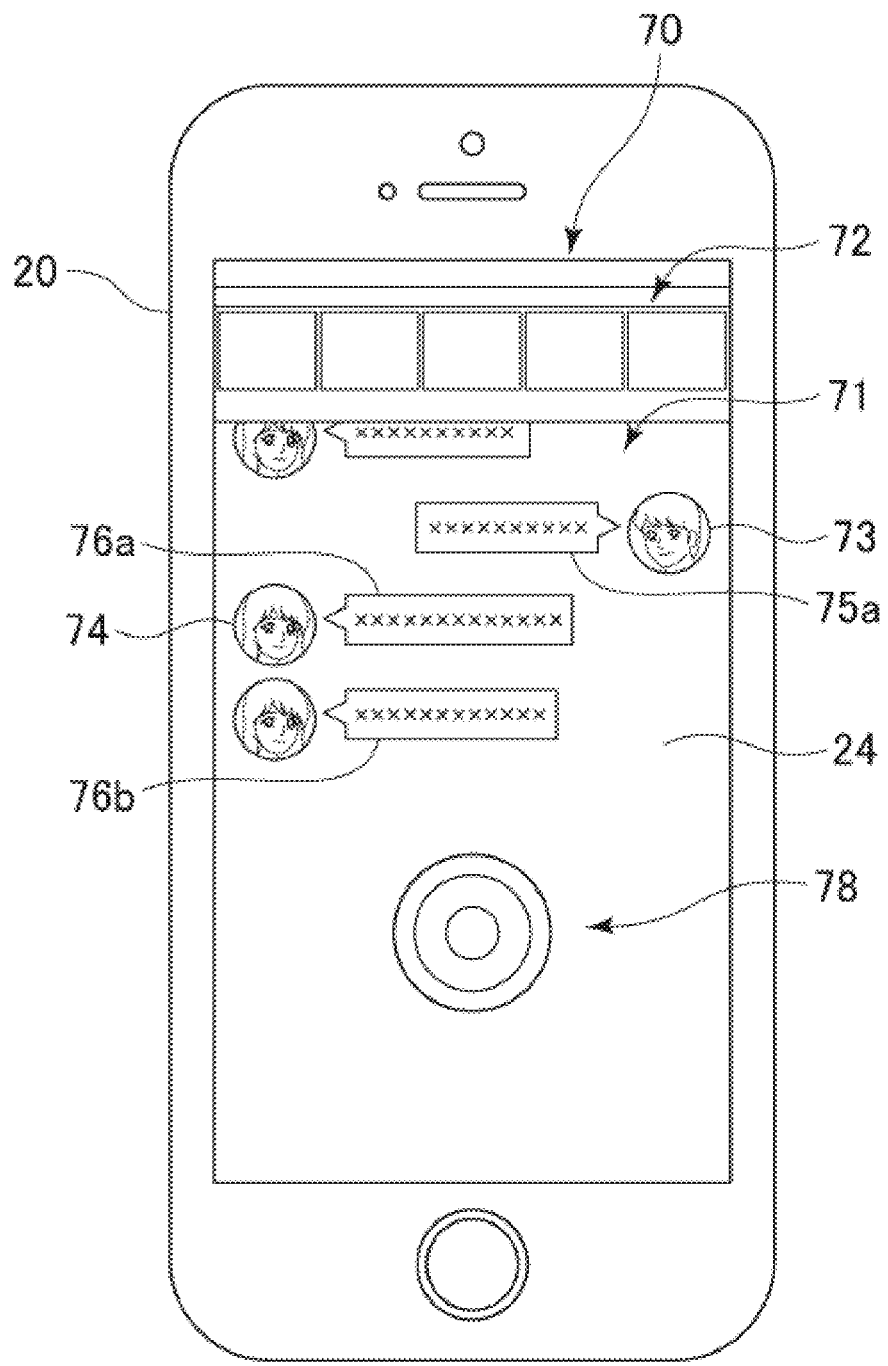
FIG. 7 shows an example of a display image in the chat mode according to an embodiment.

Next, with reference to FIGS. 6 and 7, a chat process in the chat mode will be described. FIG. 6 is a flowchart showing the flow of the process in the chat mode in one embodiment, and FIG. 7 shows an example of a display image in the chat mode. It is assumed that, at the start of the chat mode, the HMD 10 is not mounted on the head of the user 5 and the information processing device 20 is detached from the attachment 11.

In the application processing system 1, the game is started in the chat mode. In step S11, a login screen for logging in to the chat mode is displayed on the display 24 of the information processing device 20. When the login process is performed by the user 5, the chat process proceeds to step S12.

In step S12, the user 5 and the virtual character exchange messages thereby to perform a chat therebetween. After logging into the chat mode, a chat display image for displaying a chat performed between the user 5 and the virtual character is generated, and the chat display image is displayed on the display 24. FIG. 7 shows a chat display image 70 which is an example of the chat display image displayed on the display 24. The chat display image 70 has a chat display area 71 including an icon 73 corresponding to the user 5, an icon 74 corresponding to the virtual character, a message 75a from the user 5, messages 76a and 76b from the virtual character, and a switch start object 78. In addition, the chat display image 70 has a menu area 72 arranged at the top of the chat display area 71. The virtual character's messages 76a and 76b are specified based on the chat data 28b and other data stored in the storage 72 in accordance with the application processing program. For example, messages of the virtual character are displayed sequentially from the message in the root node with reference to the chat data 28b defined in the form of the tree structure. At the branch point of nodes, a node is selected depending on a branch condition and a message corresponding to the selected node is displayed.

The user 5 is able to select one from among the options included in the chat display image 70. The selection is performed, for example, by touching with a finger an area on the display 24 where the option desired to be selected is displayed. Once the selection is made, a message 75b corresponding to the selected option is newly displayed in the chat display area 71 as a message from the user 5.

In step S13, it is determined whether the mode switch condition from the first mode to the second mode is satisfied or not. An example of the mode switch condition from the first mode to the second mode is that a predetermined duration of time (for example, one minute) has elapsed from the start of the chat mode. The elapsed time from the start of chat mode is measured using, for example, a system clock. The process returns to step S12 and the chat is continued until it is determined that the mode switch condition is satisfied. When it is determined that the mode switch condition is satisfied, the chat process proceeds to step S14.

In step S14, the switch start object 78 is displayed on the display 24, and the chat process proceeds to step S15. As shown in FIG. 7, the switch start object 78 is displayed as, for example, an object having a circular profile in the chat display area 71. When it is confirmed that the switch start object is selected in step S15, the chat process proceeds to step S16. When the selection of the switch start object is not confirmed even after a predetermined duration of time (for example, 10 seconds) has elapsed since the switch start object is displayed, it is determined that the switch start object has not been selected and the chat process is terminated. Alternatively, the process may return to step S12 and a process for resuming the chat may be performed when it is determined that the switch start object has not been selected. Whether the switch start object is selected or not may be determined based on an operation performed on the touch-screen panel 24b. For example, when an operation (for example, a tap operation) to touch the touch-screen panel 24b at a position overlapping the display area of the switch start object is detected via a detection signal of the touch-screen panel 24b, it is determined that the switch start object is selected.

In step S16, a switch process to switch to the VR mode, which is the second mode, is started. When the switch process is started, the chat process is terminated. In the chat mode, choices of scenes in the VR mode to be switched to may be displayed on the display 24. The user 5 is able to select one scene that he/she likes from among these choices.

The above chat process is executed by the chat mode execution unit 21a. The chat mode execution unit 21a is capable of executing the above-described chat process alone or in cooperation with other functions as appropriate. The chat process may be performed using, as required, data stored in a storage other than the storage 27, detection information obtained by various sensors, and any other data, in addition to the data stored in the storage 27.

In the mode switch process from the chat mode as the first mode to the VR mode as the second mode, a guidance prompting the user to put on the HMD 10 is displayed on the display 24 of the information processing device 20. Following the guidance, the switch object is displayed on the display 24. When the user 5 selects the switch object, the VR mode is started. The user 5 can select the switch object by putting on the HMD 10 and gazing at the switch object for a predetermined duration of time.

Figure 8:
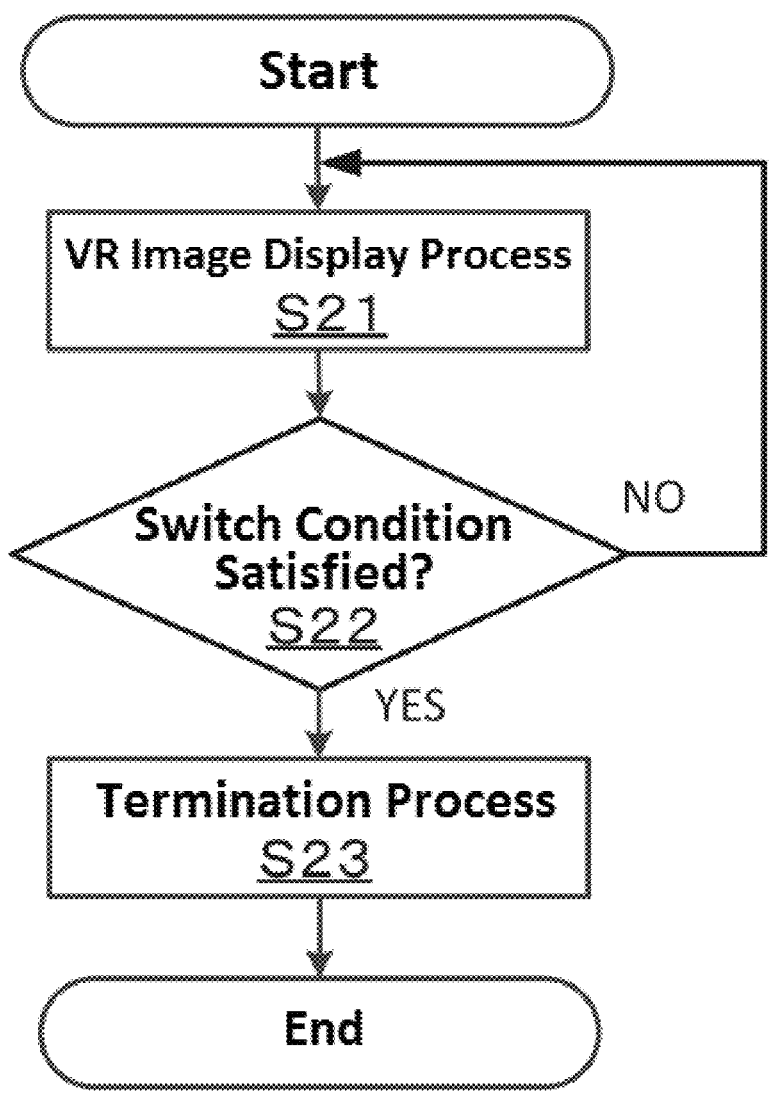
FIG. 8 is a flowchart of a process in a VR mode according to an embodiment.
Figure 9:
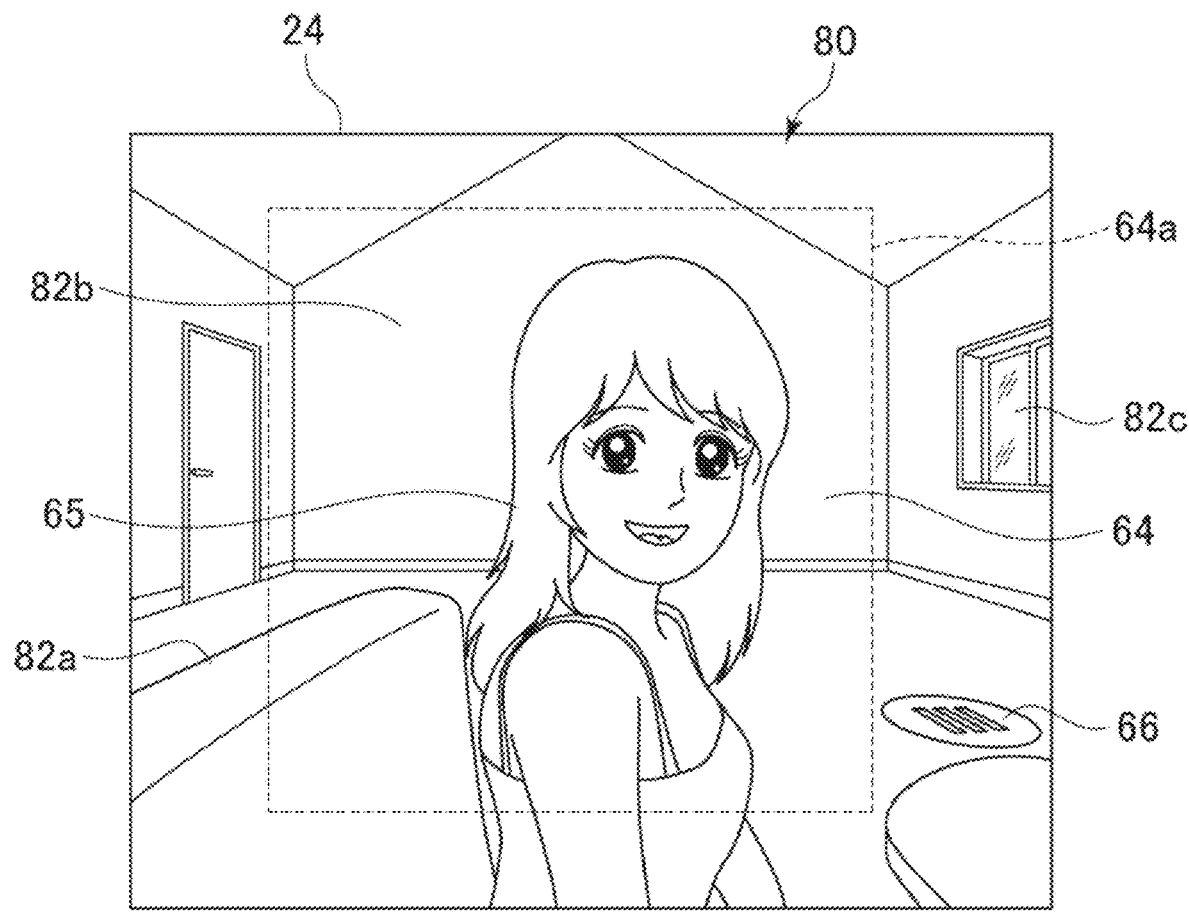
FIG. 9 shows an example of an image displayed in the VR mode according to an embodiment.

Next, a VR process in the VR mode will be described with reference to FIGS. 8 to 9. FIG. 8 is a flowchart showing the flow of the VR process in the VR mode in one embodiment, and FIG. 9 shows an example of a display image in the VR mode. It is assumed that the HMD 10 is mounted on the head of the user 5 at the start of the VR mode. In the following description about the VR mode, it is supposed that the user 5 has selected the first scene in the chat mode. Various scenes may be set as the first scene. For example, the first scene may be a scene for having conversation at any place indoor or outdoor. The VR mode in FIG. 8 is repeated until the termination condition is satisfied. The termination condition may include, for example, that a predetermined duration of time (for example, one minute) has elapsed from the start of the VR mode, that an operation for termination has been detected, that the last event included in the scenario being executed in the VR mode has ended, and any other conditions.

When the VR mode is started, the VR process proceeds to step S21 where image information of the virtual space corresponding to the first scene is generated, and an image corresponding to the image information is output to the display 24. The image information of the virtual space 60 for the first scene is generated by referring to, for example, the image data 28a. The VR process proceeds to step S21 where image information of the initial display area 63 in the virtual space 60 for the first scene is generated, and an image corresponding to the image information is output to the display 24. FIG. 9 shows an example of a display image of the initial display area 63 for the first scene. The VR image 80 shown in FIG. 9 includes images representing the virtual character 65, the menu object 66, the objects 82a to 82c corresponding to the background, and any other various objects. The menu object 66 is located outside the primary display area 64. Since the VR image 80 is an image viewed from the user's own point of view, the image representing the user 61 is not included in the VR image 80.

The virtual character image 65 is able to perform various actions in the virtual space. For example, the action that the virtual character image 65 performs may include talking to the user 61 (toward the position of the user 61 in the virtual space), traveling in the virtual space, picking up an object placed in the virtual space, and any other various actions in the virtual space.

When movement of the head of the user 5 is detected by the sensor unit 25 of the HMD 10 while the VR image 80 is displayed on the display 24, a first action of the user 61 in the virtual space 60 is specified based on the detected movement of the head. Then, an action (reaction) of the virtual character responsive to the specified first action of the user 61 is determined. Subsequently image information of the virtual character image 65 that performs the determined action is generated. The image information generated in this way is output to the display 24. For example, when it is detected that the user 5 nods his/her head (the motion of nodding), the action of nodding is specified as the first action of the user 61 in the virtual space 60 based on the detection information of the HMD 10. Then, image information of the virtual character image 65 reacting to the nodding motion of the user 61 as the first action is generated, and the image information is displayed on the display 24. In this manner, in the VR mode, interaction between the user and the virtual character 65 is realized using the stereoscopic image of the virtual character.

In step S22, it is determined whether or not the termination condition for terminating the VR image display process is satisfied. When it is determined that the termination condition is not satisfied, the VR process returns to step S21 to continue the VR image display process. When it is determined that the termination condition is satisfied, the VR process proceeds to step S23.

In step S23, the termination process of the VR mode is performed. The termination process may include displaying on the display 24 a guidance for prompting the player to remove the information processing device 20 from the attachment 11, and displaying a login screen to log in to the chat mode which is the first mode.

The above VR process is executed by the VR mode execution unit 21c. The VR mode execution unit 21c is capable of executing the VR process alone or in cooperation with other functions as needed.

Figure 10:
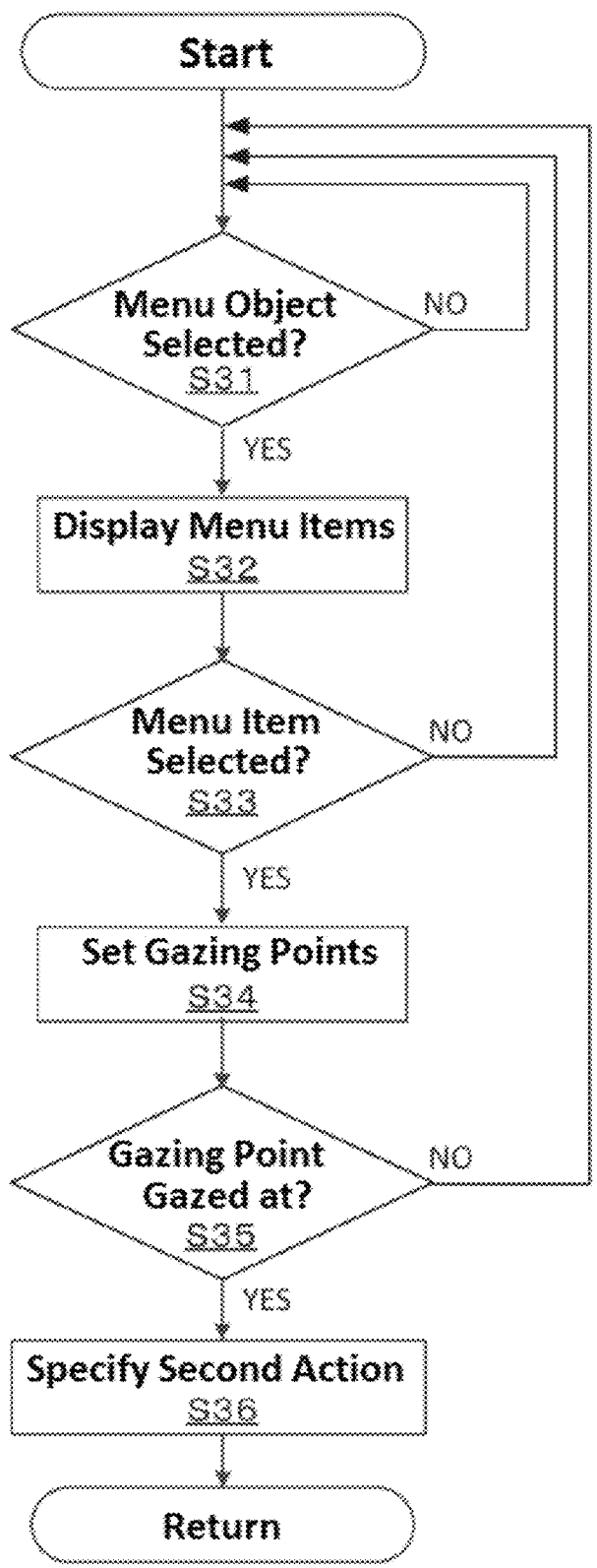
FIG. 10 is a flowchart of a process for specifying a second action according to an embodiment.

Next, with reference to FIG. 10 and FIGS. 11a to 11d, a second action specifying process for specifying the second action will be described. FIG. 10 is a flowchart showing the flow of the second action specifying process in one embodiment, and FIGS. 11a to 11d show examples of a display image in the process for specifying the second action. The process for specifying the second action is performed in parallel to the VR process described above with reference to FIG. 8.

First, in step S31, it is determined whether the menu object 66 is selected. For example, when the gazing duration of gazing at the menu object 66 reaches a predetermined amount of time, it is determined that the menu object 66 is selected. When the menu object 66 is not selected, the determination in step S31 is repeated. When it is determined that the menu object 66 is selected, the second action specifying process proceeds to step S32.

Figure 11A:
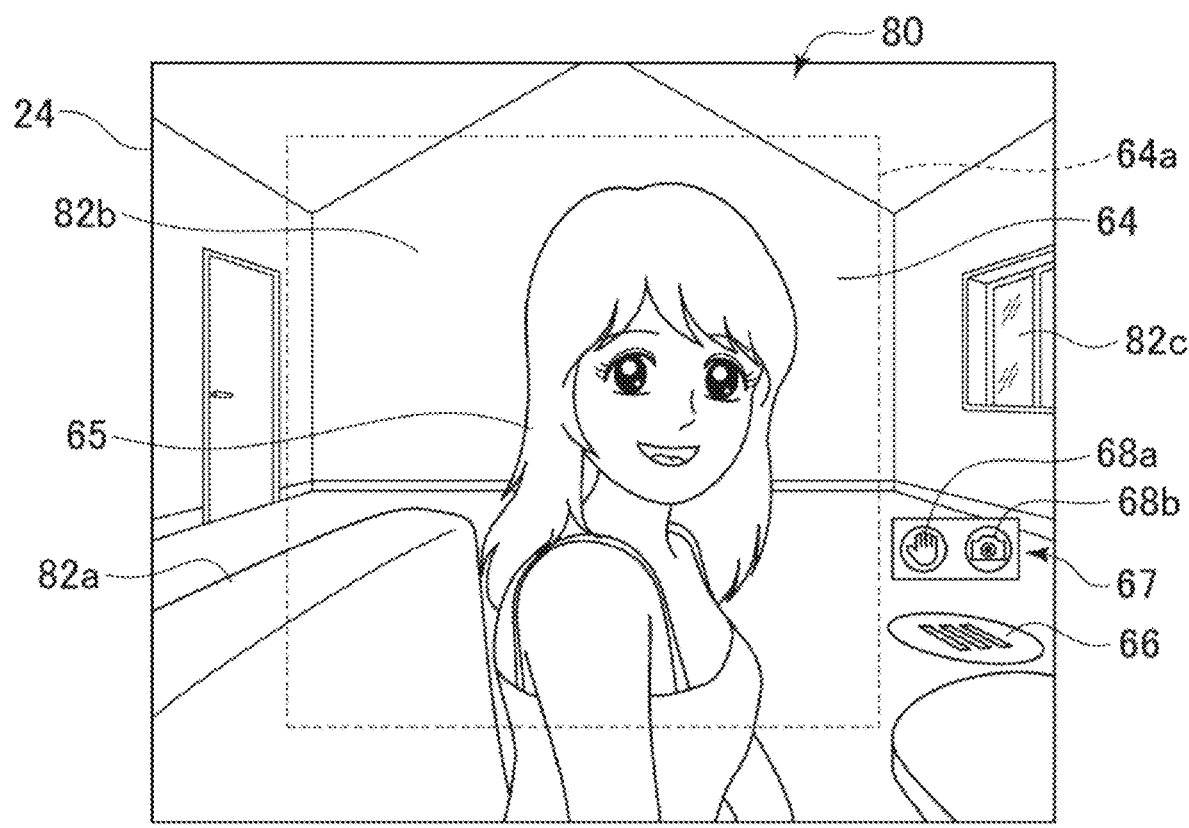
FIG. 11*a* shows an example of an image displayed in the VR mode according to an embodiment. The display image of FIG. 11*a* includes images representing menu item icons.

In step S32, the menu items associated with the menu object 66 are displayed on the display 24. FIG. 11a shows an example of the image of the virtual space including the menu items associated with the menu object 66. The VR image 80 shown in FIG. 11a includes two icons corresponding to two menu items, respectively. More specifically, the VR image 80 includes the menu image 67, and the menu image 67 includes a menu item icon 68a and a menu item icon 68b. The menu item icon 68a represents a menu item corresponding to a hand action related to a motion of a hand of the user 61 in the virtual space 60, and the menu item icon 68b represents a menu item corresponding to a photograph action related to photographing in the virtual space 60. When the process for displaying the menu items on the display 24 is performed, the second action specifying process proceeds to step S33. The menu item icon 68a and the menu item icon 68b displayed in the virtual space may be displayed so as to be parallel to a surface of a virtual structure located in the virtual space. For example, in the embodiment shown, the menu item icon 68a and the menu item icon 68b may be displayed so as to be parallel to the surface of the floor, the surface of the wall, or the surface of the ceiling of the room in the virtual space shown in FIG. 11a. With such arrangement of the menu item icon 68a and the menu item icon 68b, it is possible to display the menu item icon 68a and the menu item icon 68b as if they are virtual objects located in the virtual space. This prevents the sense of immersion of the user 61 from being reduced. It is also possible that the menu item icon 68a is located on a different surface in the virtual space than the menu item icon

68b. Components of the menu image 67 other than the menu item icon 68a and the menu item icon 68b may be displayed so as to be parallel to a surface of a virtual structure located in the virtual space.

In step S33, it is determined whether any of the menu item icons displayed in step S32 is selected. For example, the gazing duration of gazing at any of the menu item icons included in the VR image 80 reaches a predetermined amount of time, it is determined that the menu item icon is selected. In the example shown, when the gazing duration of gazing at the menu item icon 68a reaches a predetermined amount of time, it is determined that the menu item icon 68a is selected, and when the gazing duration of gazing at the menu item icon 68b reaches a predetermined amount of time, it is determined that the menu item icon 68b is selected. It is also possible that two or more menu item icons are selected. When selection of a menu item icon is not confirmed in step S33, the menu item icons are hidden, and the second action specifying process returns to step S31. When it is determined that a menu item icon is selected, the second action specifying process proceeds to step S34.

Figure 11B:
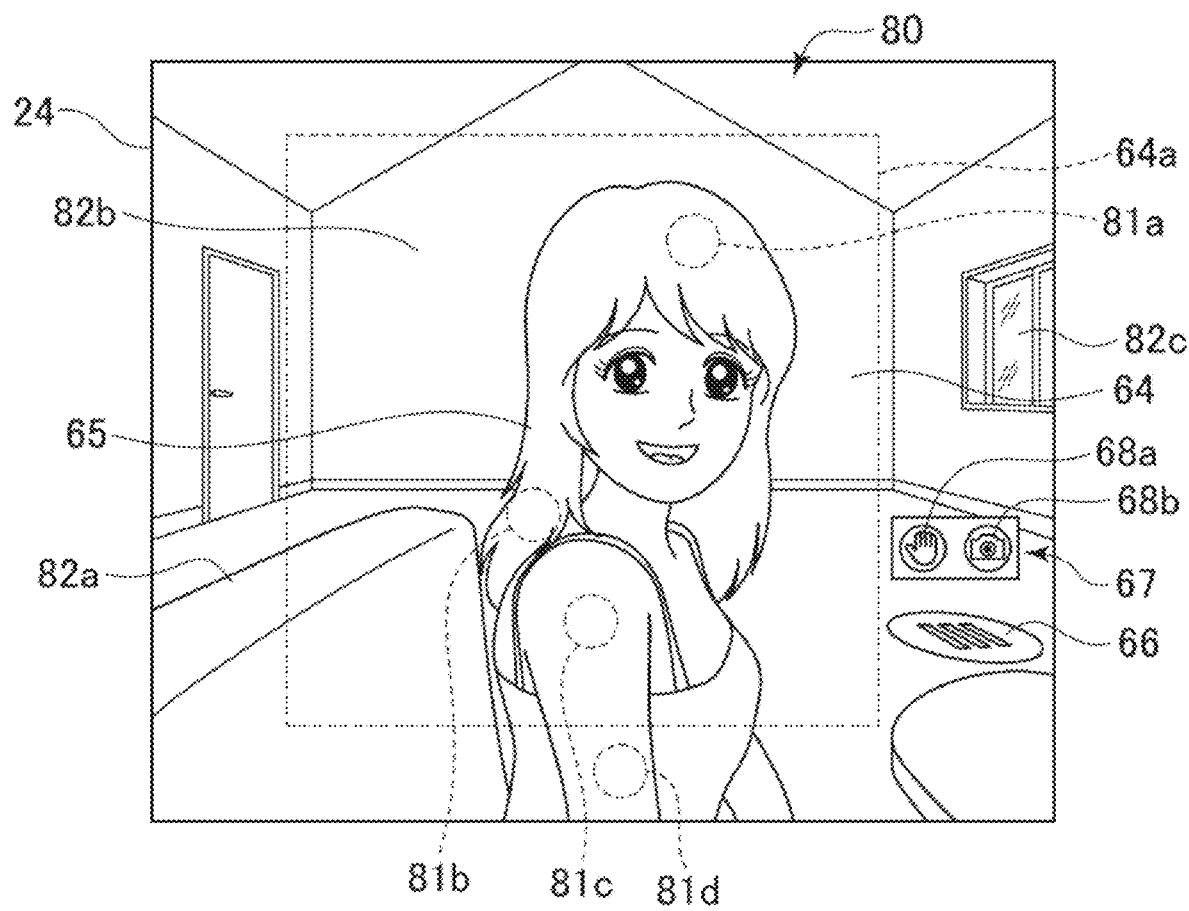
FIG. 11*b* shows an example of an image displayed in the VR mode according to an embodiment. A plurality of character gazing points are set on the virtual character shown in FIG. 11.

In step S34, one or more character gazing points are set on the virtual character 65. Setting of the character gazing points on the virtual character 65 will be hereinafter described with reference to FIG. 11b. FIG. 11b schematically shows character gazing points in the VR image 80 for describing the character gazing points set on the virtual character 65. The character gazing points set in the VR image 80 may be either visible or invisible to the user 5. In the example shown in FIG. 11b, a plurality of character gazing points 81a to 81d are set on the virtual character 65. Each of the one or more character gazing points set on the virtual character 65 is associated with a particular part of the virtual character 65. In the example shown in FIG. 11b, the character gazing points 81a to 81d are associated respectively with a head, a hair, a shoulder, and an arm of the virtual character 65 simulating a woman. When the character gazing points are set on the virtual character 65, the second action specifying process proceeds to step S35.

In step S35, it is determined whether any of the one or more character gazing points set on the virtual character 65 is gazed at. In the example shown in FIG. 11b, when the gazing duration of gazing at any of the character gazing points 81a to 81d reaches a predetermined amount of time, it is determined that the character gazing point is selected. When none of the character gazing points is gazed at in step S35, setting of the character gazing points is canceled, and the second action specifying process returns to step S31. When it is determined that one of the character gazing points is gazed at, the second action specifying process proceeds to step S36.

In step S36, an action toward the virtual character 65 is specified based on the menu item selected in step S33 and the character gazing point gazed at in step S35, and the specified action is performed toward the virtual character 65. For example, when the menu item icon 68a associated with a hand action is selected in step S33, and the character gazing point 81a associated with the head of the virtual character 65 is gazed at in step S35, the action of patting the head of the virtual character 65 is specified as the second action of the user 61 to be performed toward the virtual character 65 in the virtual space 60.

When the menu item icon 68a is selected, the second action may be specified differently in accordance with the character gazing point that is gazed at. For example, when the menu item icon 68a is selected as in the above example, and the character gazing point 81c is gazed at instead of the character gazing point 81a, an action different from the action of "patting" may be specified as the second action. When the menu item icon 68a is selected and the character gazing point 81c is gazed at, for example, an action of "poking" the shoulder of the virtual character 65 may be specified as the second action.

Figure 11C:
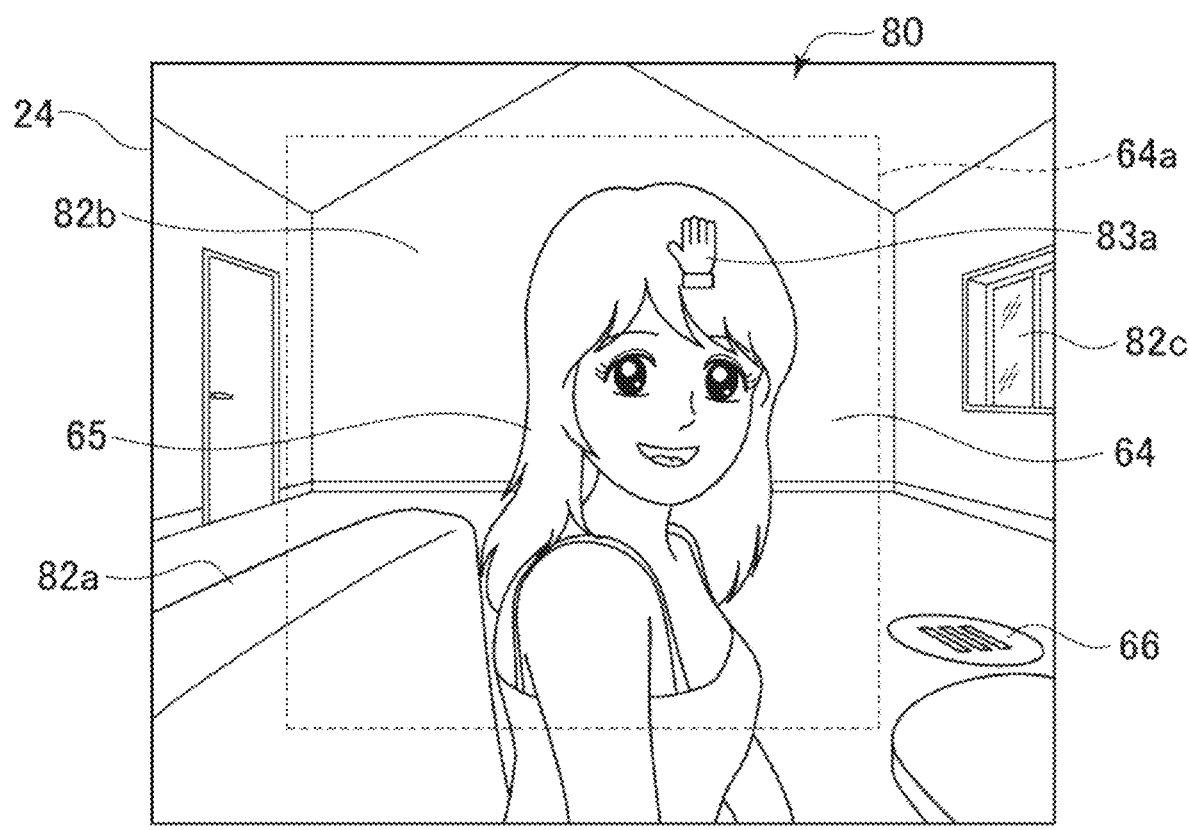
FIG. 11*c* shows an example of an image displayed in the VR mode according to an embodiment. The display image of FIG. 11*c* includes an image representing the second action of the user in the virtual space.
Figure 11D:
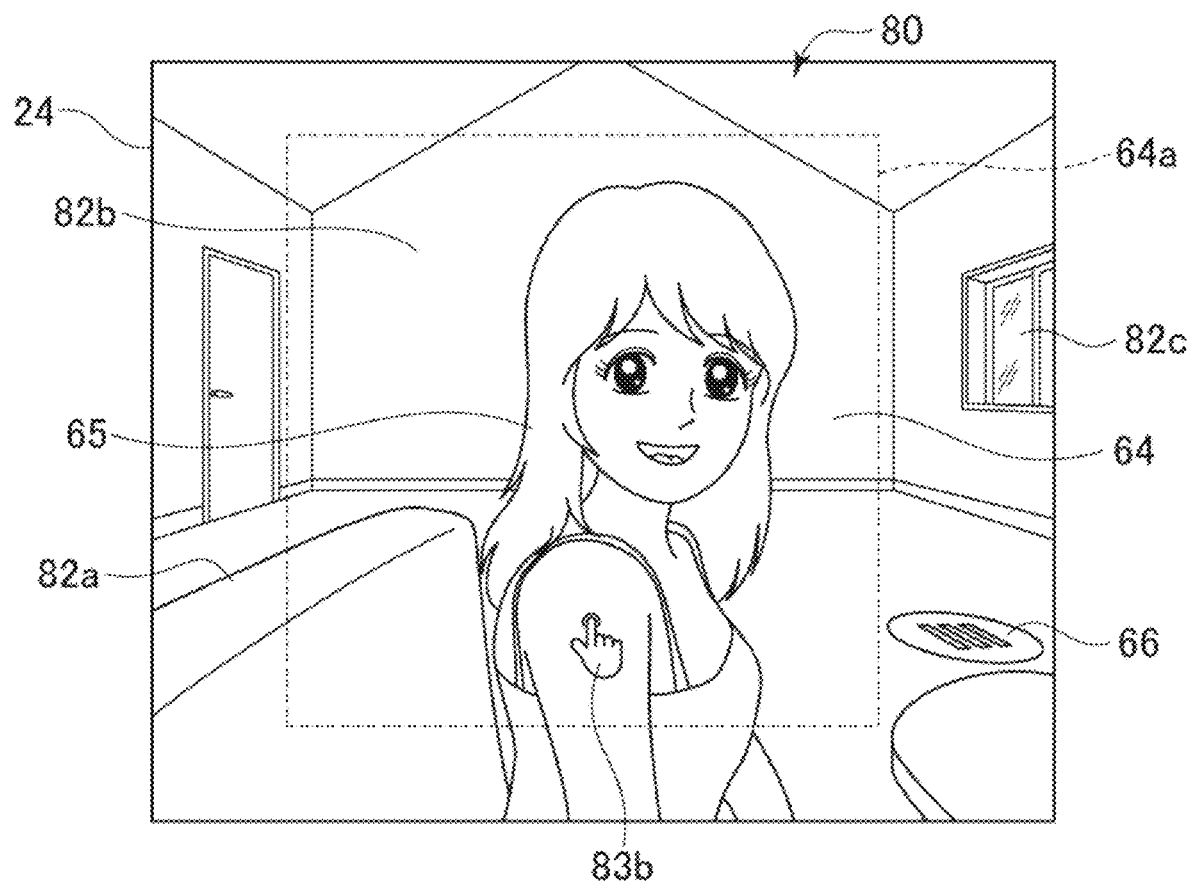
FIG. 11*d* shows an example of an image displayed in the VR mode according to an embodiment. The display image of FIG. 11*d* includes an image representing the second action of the user in the virtual space.

When the second action is specified, the specified second action is performed toward the virtual character 65. For example, the action of patting the head of the virtual character 65 is specified as the second action, an image representing the second action is displayed on the display 24 as the VR image 80, as shown in FIG. 11c. In the example shown in FIG. 11c, an image 83a representing a virtual hand of the user 61 is displayed near the head of the virtual character 65, so as to display the action of the user 61 patting the head of the virtual character 65 in the virtual space 60. In another example, when the action of poking the shoulder of the virtual character 65 is specified as the second action, an image 83b representing a virtual hand of the user 61 is displayed near the shoulder of the virtual character 65, so as to display the action of the user 61 poking the shoulder of the virtual character 65 in the virtual space 60. The image 83a and the image 83b may be different from each other so as to express the difference between the actions performed toward the virtual character 65. The virtual character 65 performs an action (reaction) in accordance with the application processing program in response to the second action of the user 61.

In step S33, it is also possible that the menu item icon 68b associated with a photograph action is selected and one of the character gazing points (for example, the character gazing point 81a) set on the virtual character 65 is gazed at. In this case, the action of taking a photograph including the virtual character 65 is specified as the second action. In response to the selection of the menu item icon 68b, the virtual character 65 may perform an action of posing toward a camera of the user 61. It is also possible that, in response to selection of one of the character gazing points set on the virtual character 65, the action of releasing the shutter is performed. In this case, an image displayed on the display 24 when one of the character gazing points is selected is stored on the storage 27 as the action photographed by the photograph action.

The second action specifying process described above is executed by the VR mode execution unit 21c. The VR mode execution unit 21c is capable of executing the second action specifying process alone or in cooperation with other functions as needed.

Figure 12:
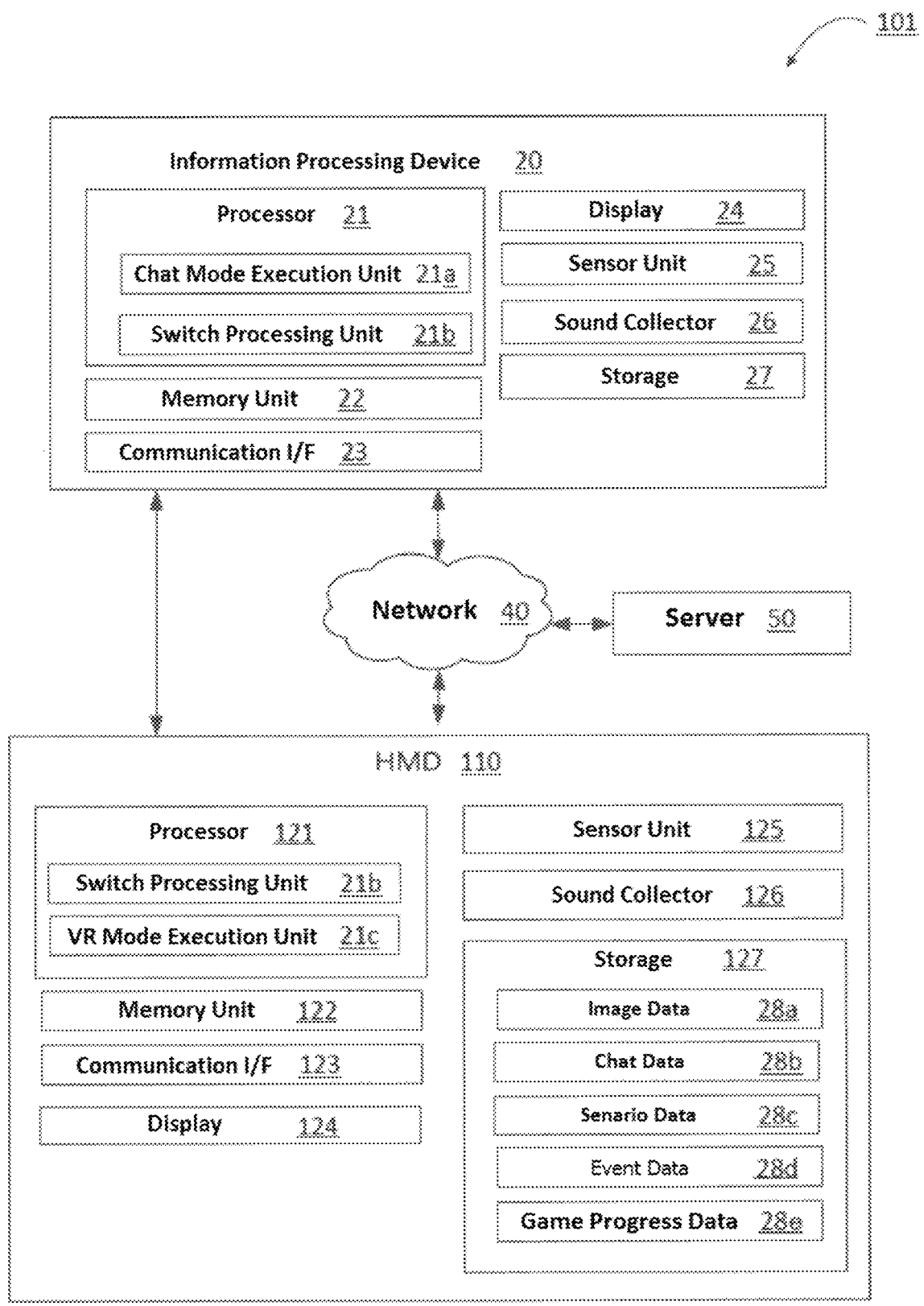
FIG. 12 is a block diagram illustrating an application processing system according to another embodiment of the disclosure.

The application processing system according to another embodiment will be described with reference to FIG. 12. FIG. 12 is a block diagram illustrating an application processing system 101 according to another embodiment. The application processing system 101 includes the information processing device 20 and the HMD 110. The application processing system 101 is different from the application processing system 1 in that the VR mode can be provided without attaching the information processing device 20 to the HMD 110. Hereinafter, the application processing system 101 will be described focusing on the differences from the application processing system 1.

The HMD 110, the information processing device 20, and the server 50 are communicably interconnected over the network 40. The HMD 110 and the information processing device 20 may be connected so as to communicate with each other according to a short-range wireless system such as Bluetooth (registered trademark) without using the network 40. The HMD 110 is different from the HMD 10 of the application processing system 1 in that the VR mode can be provided even if the information processing device 20 is not mounted.

The HMD 110 includes a computer processor 121, a memory unit 122, a communication I/F 123, a display 124, a sensor unit 125, a sound collector 126, and a storage 127. The computer processor 121, the memory unit 122, the communication I/F 123, the display 124, the sensor unit 125, the sound collector 126, and the storage 127 are configured similarly to the computer processor 21, the memory 22, the communication I/F 23, the display 24, the sensor unit 25, the sound collector 26, and the storage 27 of the information processing device 20, respectively. However, the display 124 may not have a touch-screen panel. These components of the HMD 110 are built in a casing. The casing may be formed in a goggle-like shape, as is the casing 11*a*. The image data 28*a*, the chat data 28*b*, the scenario data 28*c*, the event data 28*d*, and the game progress data 28*e* may be stored in the storage 127 or may be stored in the storage 27 or other storages.

The functions of the chat mode execution unit 21*a*, the switch processing unit 21*b*, and the VR mode execution unit 21*c* are distributed between the information processing device 20 and the HMD 110. Specifically, the function of the chat mode execution unit 21*a* is realized in the information processing device 20, and the function of the VR mode execution unit 21*c* is realized in the HMD 110. A part of the function of the switch processing unit 21*b* is realized by the information processing device 20, and the rest is realized in the HMD 110.

When starting a game in the application processing system 101, the user 5 uses the information processing device 20 to start the chat mode. The process for executing the chat mode is performed by the chat mode execution unit 21*a* of the information processing device 20.

When the mode switch condition is satisfied in the chat mode and the switch start object is selected, the mode switch process for switching to the VR mode is started.

When the VR mode is started, the processing of the VR mode is performed by the VR mode execution unit 21*c* of the HMD 110.

In this way, the application processing system 101 can provide an interaction with a virtual character to the user 5 via the HMD 110.

According to the above embodiments, the following advantageous effects can be obtained. In the application processing systems 1, 101, the user 61 can specify a second action not associated with a motion of his/her head in the virtual space 60, by selecting a menu object 66 and then gazing at the character gazing points 81*a* to 81*d* set on the virtual character 65. Thus, the second action not associated with the motion of the head of the user 61 in the virtual space 60 can be performed without using an operation device other than the head mounted display 10, 110, such as an operation controller configured to be held with a hand.

The second actions associated with a motion of a hand of the user in the virtual space 60 include actions of "patting," "striking," "poking," and "pinching" performed on the virtual character 65, an action of "clasping a hand" of the virtual character, an action of handling an item manually (for example, an action of taking a photograph), and any other actions related to a motion of a hand of the user 61 in the virtual space 60.

In the application processing system 1, 101, a second action associated with a motion of a hand of the user 61 in the virtual space 60 is specified by gazing at the character gazing points 81*a* to 81*d* set on the virtual character 65, not by the position or motion of a hand of the user in the real world. Thus, the user can perform the second action not associated with a motion of his/her head without using an operation device other than the head mounted display 10, 110.

In the application processing systems 1, 101, the user 61 can perform a second action not associated with a motion of his/her head, by selecting a specific object.

In the application processing systems 1, 101, a plurality of second actions including the first gazing point action and the second gazing point action can be used selectively in accordance with the character gazing points 81*a* to 81*d*. This increases the variety of the second actions not associated with a motion of the head of the user 61.

In the application processing systems 1, 101, various types of second actions can be used selectively in accordance with selected menu items. This increases the variety of the second actions not associated with a motion of the head of the user 61.

In the above embodiment, the menu object 66 is a functional object that makes second actions possible. The user 5 may select the menu object 66 unintentionally, depending on the arrangement and the display mode in the virtual space. Functional objects such as the menu object 66 may reduce the sense of immersion of the user in the virtual space. In the application processing systems 1, 101, the menu object 66 is located outside the primary display area 64 in the virtual space 60, and therefore, it is possible to inhibit erroneous selection and reduction of the sense of immersion.

In the application processing systems 1, 101, the primary display area can be set appropriately in accordance with the scenes. For example, the position of the primary display area 64 is different between the first scene and the second scene in accordance with the posture of the user 61.

In the application processing systems 1, 101, it is possible that the virtual character 65 performs a reaction in response to an action of the user 61, thereby establishing an interaction between the user and the virtual character 65.

Embodiments of the present invention are not limited to the above embodiments but various modifications are possible within a spirit of the invention. For example, some or all of the functions executed by the computer processor 21 and the computer processor 121 may be realized by a computer processor which is not shown in the above-mentioned embodiment without departing from the scope of the invention. For example, the application processing system 1 and the application processing system 101 may include a game machine that executes at least a part of the application processing program. Some of the functions realized by processing of the computer processor 21 or the computer processor 121 may be realized by processing performed by the game machine.

Embodiments of the disclosure may include various devices and electronic components other than those described above. For example, the application processing system 1 and the application processing system 101 may be provided with a control device for receiving operations of the user 5, in addition to the information processing device 20 and the HMD 10, 110. The application processing system 1 and the application processing system 101 may detect operations of the user 5 via the control device and perform the processing of the game in accordance with the detected operations.

The virtual character 65 in the virtual space may be controlled based on data or commands other than the data concerning the actions of the virtual character included in the scenario data 28c. For example, the virtual character may be controlled to move in synchronization with movements of a player other than the player 5. In one embodiment, the server 50 may generate an animation of a virtual character based on motion data indicating body movements and/or facial expression movements of the player other than the player 5. The server 50 may cause the display 24 of the information processing device 20 to display an image of the virtual space including the virtual character generated as described above. In this way, the player 5 is able to interact with the virtual character moving in synchronization with the movements of another player. Generation of an animation that moves in synchronization with movements of a player (user) is described in Japanese Patent Application Publication No. 2018-236152, the content of which is incorporated herein by reference in its entirety. In one embodiment, an animation of a virtual character moving in synchronization with movements of the player 5 in the real space may be generated based on motion data indicating body movements and facial expression movements of the player 5, and the virtual space may include the virtual character of the player 5. In this way, the player 5 is able to interact with other player(s) through the virtual character in the virtual space.

The procedures described herein, particularly those described with a flowchart, are susceptible of omission of part of the steps constituting the procedure, adding steps not explicitly included in the steps constituting the procedure, and/or reordering the steps. The procedure subjected to such omission, addition, or reordering is also included in the scope of the present invention unless diverged from the purport of the present invention.

What is claimed is:

1. An application processing system for providing an interaction with a virtual character and a user, the application processing system comprising:
   memory storing computer program instructions; and
   a processor configured to execute the computer program instructions to cause the processor to:
      output an image of a virtual space including the virtual character, the image being output to a head mounted display worn on a head of a user;
      specify a first action for interacting with the virtual character, the first action being associated with a motion of the head of the user in the virtual space based on one or more items of detection information obtained by the head mounted display;
      determine that a specific object included in the virtual space has been selected based on the one or more items of detection information obtained by the head mounted display;
      specify, based on the specific object being selected, a second action for interacting with the virtual character, the second action not being associated with a motion of the head of the user in the virtual space based on the one or more items of detection information, wherein:
         the specific object is different from the virtual character,
         the specific object is associated with two or more menu items, the two or more menu items including a first menu item and a second menu item, and the second action includes a first menu item action associated with the first menu item and a second menu item action associated with the second menu item;
      determine that the first menu item or the second menu item has been gazed at;
      specify the first menu item action or the second menu item action as the second action based on the first menu item or the second menu item being determined to have been gazed at; and
      cause, based on the specific object being selected, the two or more menu items to be displayed such that gazing at each of the two or more menu items is detected based on the one or more items of detection information.

2. The application processing system of claim 1, wherein the second action is associated with a motion of a hand of the user in the virtual space.

3. The application processing system of claim 1, wherein the second action is associated with use of a tool by the user in the virtual space.

4. The application processing system of claim 1, wherein at least one of the first menu item or the second menu item is arranged in the virtual space so as to be parallel to a surface of a virtual structure.

5. The application processing system of claim 1, wherein the first menu item is arranged so as to be parallel to one surface in the virtual space and the second menu item is arranged so as to be parallel to another surface in the virtual space.

6. The application processing system of claim 1, wherein the processor is further caused to:
   specify a first primary display area in the virtual space for a first scene, wherein the specific object is located outside the first primary display area for the first scene.

7. The application processing system of claim 6, wherein the processor is further caused to:
   specify a second primary display area in the virtual space for a second scene, wherein the specific object is located outside the second primary display area for the second scene.

8. The application processing system of claim 1, wherein the processor is further caused to:
   generate the virtual space such that the virtual space includes the virtual character performing a reaction in response to at least one of the first action or the second action.

9. The application processing system of claim 1, wherein the first action is associated with a communication between the user and the virtual character.

10. A method of processing an application for providing an interaction with a virtual character and a user, the method being performed by one or more computer processors executing computer-readable instructions, the method comprising:
   outputting an image of a virtual space including the virtual character, the image being output to a head mounted display worn on a head of a user;
   specifying a first action for interacting with the virtual character, the first action being associated with a motion of the head of the user in the virtual space based on one or more items of detection information obtained by the head mounted display;
   determining that a specific object included in the virtual space has been selected based on the one or more items of detection information obtained by the head mounted display;
   specifying, based on the specific object being selected, a second action for interacting with the virtual character, the second action not being associated with a motion of the head of the user in the virtual space based on the one or more items of detection information, wherein:

the specific object is different from the virtual character, the specific object is associated with two or more menu items, the two or more menu items including a first menu item and a second menu item, and the second action includes a first menu item action associated with the first menu item and a second menu item action associated with the second menu item;

determining that the first menu item or the second menu item has been gazed at;

specifying the first menu item action or the second menu item action as the second action based on the first menu item or the second menu item being determined to have been gazed at; and causing, based on the specific object being selected, the two or more menu items to be displayed such that gazing at each of the two or more menu items is detected based on the one or more items of detection information.

11. The method of claim 10, comprise, further comprising:

specifying a first primary display area in the virtual space for a first scene, wherein the specific object is located outside the first primary display area for the first scene; and specifying a second primary display area in the virtual space for a second scene, wherein the specific object is located outside the second primary display area for the second scene.

12. The method of claim 10, further comprising:

generating the virtual space such that the virtual space includes the virtual character performing a reaction in response to at least one of the first action or the second action.

13. A non-transitory computer-readable storage medium storing an application processing program for providing an interaction with a virtual character and a user, the application processing program being executed by one or more computer processors to effectuate operations comprising:

outputting an image of a virtual space including the virtual character, the image being output to a head mounted display worn on a head of a user;

specifying a first action for interacting with the virtual character, the first action being associated with a motion of the head of the user in the virtual space based on one or more items of detection information obtained by the head mounted display;

determining that a specific object included in the virtual space has been selected based on the one or more items of detection information obtained by the head mounted display;

specifying, based on the specific object being selected, a second action for interacting with the virtual character, the second action not being associated with a motion of the head of the user in the virtual space based on the one or more items of detection information, wherein:

the specific object is different from the virtual character, the specific object is associated with two or more menu items, the two or more menu items including a first menu item and a second menu item, and the second action includes a first menu item action associated with the first menu item and a second menu item action associated with the second menu item;

determining that the first menu item or the second menu item has been gazed at;

specifying the first menu item action or the second menu item action as the second action based on the first menu item or the second menu item being determined to have been gazed at; and causing, based on the specific object being selected, the two or more menu items to be displayed such that gazing at each of the two or more menu items is detected based on the one or more items of detection information.

14. The non-transitory computer-readable storage medium of claim 13, wherein the second action is associated with a motion of a hand of the user in the virtual space.

15. The non-transitory computer-readable storage medium of claim 13, wherein the operations further comprise:

specifying a first primary display area in the virtual space for a first scene, wherein the specific object is located outside the first primary display area for the first scene; and specifying a second primary display area in the virtual space for a second scene, wherein the specific object is located outside the second primary display area for the second scene.

16. The non-transitory computer-readable storage medium of claim 13, wherein the operations further comprise:

generating the virtual space such that the virtual space includes the virtual character performing a reaction in response to at least one of the first action or the second action.

17. The non-transitory computer-readable storage medium of claim 13, wherein the second action is associated with a use of a tool by the user in the virtual space.

* * * * *